(12) United States Patent
Liu et al.

(10) Patent No.: US 7,474,695 B2
(45) Date of Patent: Jan. 6, 2009

(54) EQUALIZATION AND DECISION-DIRECTED LOOPS WITH TRELLIS DEMODULATION IN HIGH DEFINITION TV

(75) Inventors: Tian-Min Liu, Laguna Niguel, CA (US); Loke Kun Tan, Laguna Niguel, CA (US); Steven T. Jaffe, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 10/895,879

(22) Filed: Jul. 21, 2004

(65) Prior Publication Data

US 2004/0258184 A1 Dec. 23, 2004

Related U.S. Application Data

(63) Continuation of application No. 09/433,733, filed on Nov. 3, 1999, now Pat. No. 6,775,334.

(60) Provisional application No. 60/106,921, filed on Nov. 3, 1998, provisional application No. 60/106,922, filed on Nov. 3, 1998, provisional application No. 60/106,923, filed on Nov. 3, 1998, provisional application No. 60/106,938, filed on Nov. 3, 1998, provisional application No. 60/107,103, filed on Nov. 4, 1998, provisional application No. 60/107,037, filed on Nov. 3, 1998.

(51) Int. Cl.
*H03H 7/30* (2006.01)
*H03H 7/40* (2006.01)
*H03K 5/159* (2006.01)
*H03D 1/00* (2006.01)
*H04L 27/06* (2006.01)

(52) U.S. Cl. ........................ 375/233; 375/321

(58) Field of Classification Search ......... 375/229–234, 375/346, 348, 350, 320–321, 324, 340, 269–270; 329/304
See application file for complete search history.

(56) References Cited

U.S. PATENT DOCUMENTS 3,878,468 A * 4/1975 Falconer et al. ............. 375/235

(Continued)

FOREIGN PATENT DOCUMENTS

| EP | A-0 543 586 | 5/1993 |
| EP | A-0 769 873 | 4/1997 |
| EP | A-0 887 796 | 12/1998 |

OTHER PUBLICATIONS

Lial, Hornsby and Miller, "Intermediate Algebra with early functions and graphing" 1999, Harper Collins College Publishers, Fifth Edition, pp. 470-471.*

(Continued)

*Primary Examiner*—Jean B Corrielus
(74) *Attorney, Agent, or Firm*—Sterne, Kessler, Goldstein & Fox P.L.L.C.

(57) ABSTRACT

Improved decision feedback equalizer and decision directed timing recovery systems and methods suitable for use in connection with a dual mode QAM/VSB receiver system are disclosed. A trellis decoder operates in conjunction with a decision feedback equalizer circuit on trellis coded 8-VSB modulated signals. The trellis decoder includes a 4-state traceback memory circuit outputting a maximum likelihood decision as well as a number of intermediate decisions based upon the maximum likelihood sequence path. Any number of decisions, along the sequence, may be provided as an input signal to timing recovery system loops, with the particular decision along the sequence chosen on the basis of its delay through the trellis decoder. Variable delay circuitry is coupled to the other input of the timing recovery system loops in order to ensure that both input signals bear the same timestamp. Final decisions are output from the trellis decoder to a DFE in order to enhance the DFE's ability to operate in low SNR environments. A decision sequence estimation error signal is also generated and used to drive the tap updates of both the DFE and an FFE portion of the equalizer.

11 Claims, 16 Drawing Sheets

U.S. PATENT DOCUMENTS

| | | | |
|---|---|---|---|
| 3,879,664 A * | 4/1975 | Monsen | 375/232 |
| 3,974,449 A * | 8/1976 | Falconer | 375/233 |
| 4,085,378 A | 4/1978 | Ryan et al. | |
| 4,985,900 A * | 1/1991 | Rhind et al. | 375/226 |
| 5,025,455 A | 6/1991 | Nguyen | |
| 5,052,000 A * | 9/1991 | Wang et al. | 714/758 |
| 5,214,501 A | 5/1993 | Cavallerano et al. | |
| 5,235,424 A | 8/1993 | Wagner et al. | |
| 5,282,023 A | 1/1994 | Scarpa | |
| 5,311,547 A | 5/1994 | Wei | |
| 5,321,725 A | 6/1994 | Paik et al. | |
| 5,367,536 A * | 11/1994 | Tsujimoto | 375/269 |
| 5,386,239 A * | 1/1995 | Wang et al. | 348/472 |
| 5,410,368 A | 4/1995 | Krishnamurthy et al. | |
| 5,412,693 A * | 5/1995 | Bolla et al. | 375/326 |
| 5,453,797 A | 9/1995 | Nicolas et al. | |
| 5,471,508 A * | 11/1995 | Koslov | 375/344 |
| 5,539,774 A * | 7/1996 | Nobakht et al. | 375/232 |
| 5,546,430 A | 8/1996 | Liao et al. | |
| 5,550,596 A * | 8/1996 | Strolle et al. | 348/607 |
| 5,550,810 A * | 8/1996 | Monogioudis et al. | 370/342 |
| 5,572,249 A | 11/1996 | Ghosh | |
| 5,583,889 A | 12/1996 | Citta et al. | |
| 5,596,606 A | 1/1997 | Montreuil | |
| 5,600,677 A | 2/1997 | Citta et al. | |
| 5,602,602 A | 2/1997 | Hulyalkar | |
| 5,636,251 A | 6/1997 | Citta et al. | |
| 5,659,583 A | 8/1997 | Lane | |
| 5,692,011 A | 11/1997 | Nobakht et al. | |
| 5,694,419 A | 12/1997 | Lawrence et al. | |
| 5,694,424 A * | 12/1997 | Ariyavisitakul | 375/233 |
| 5,706,057 A | 1/1998 | Strolle et al. | |
| 5,712,873 A * | 1/1998 | Shiue et al. | 375/233 |
| 5,715,012 A | 2/1998 | Patel et al. | |
| 5,748,674 A * | 5/1998 | Lim | 375/233 |
| 5,754,591 A * | 5/1998 | Samueli et al. | 375/235 |
| 5,757,885 A | 5/1998 | Yao et al. | |
| 5,793,818 A * | 8/1998 | Claydon et al. | 375/326 |
| 5,796,786 A | 8/1998 | Lee | |
| 5,799,037 A | 8/1998 | Strolle et al. | |
| 5,805,242 A | 9/1998 | Strolle et al. | |
| 5,841,478 A | 11/1998 | Hu et al. | |
| 5,872,815 A * | 2/1999 | Strolle et al. | 375/321 |
| 5,894,334 A | 4/1999 | Strolle et al. | |
| 6,005,640 A | 12/1999 | Strolle et al. | |
| 6,012,161 A * | 1/2000 | Ariyavisitakul et al. | 714/795 |
| 6,044,112 A * | 3/2000 | Koslov | 375/235 |
| 6,222,891 B1 | 4/2001 | Liu et al. | |
| 6,226,323 B1 | 5/2001 | Tan et al. | |
| 6,243,425 B1 * | 6/2001 | Langberg et al. | 375/285 |
| 6,249,557 B1 * | 6/2001 | Takatori et al. | 375/355 |
| 6,314,135 B1 * | 11/2001 | Schneider et al. | 375/232 |
| 6,411,659 B1 | 6/2002 | Liu et al. | |
| 6,434,233 B1 * | 8/2002 | Bjarnason et al. | 379/406.01 |
| 6,438,164 B2 | 8/2002 | Tan et al. | |
| 6,493,409 B1 | 12/2002 | Lin et al. | |
| 6,553,085 B1 * | 4/2003 | Trans | 375/346 |
| 6,603,801 B1 | 8/2003 | Andren et al. | |
| 6,665,308 B1 * | 12/2003 | Rakib et al. | 370/441 |
| 6,671,342 B2 | 12/2003 | Lin et al. | |
| 6,678,012 B1 * | 1/2004 | Belotserkovsky | 348/731 |
| 6,680,971 B1 * | 1/2004 | Tazebay et al. | 375/235 |
| 6,741,645 B2 | 5/2004 | Tan et al. | |
| 6,771,714 B2 | 8/2004 | Liu et al. | |
| 6,775,334 B1 | 8/2004 | Liu et al. | |
| 6,816,548 B1 * | 11/2004 | Shiue et al. | 375/233 |
| 6,842,495 B1 | 1/2005 | Jaffe et al. | |
| 7,027,528 B2 | 4/2006 | Liu et al. | |
| 7,277,481 B2 | 10/2007 | Tan et al. | |
| 7,327,819 B2 | 2/2008 | Lin et al. | |
| 7,403,579 B2 | 7/2008 | Jaffe et al. | |

ATSC Digital Television Standard, *Annex D, RF/Transmission Systems Characteristics*, pp. 46-60 (Sep. 16, 1995).

ATSC Standard, *RF/Transmission Systems*, Guide to the Use of the ATSC Digital Standard, pp. 96-101 (Oct. 4, 1995).

ATSC Standard, *Receiver Characteristics*, Guide to the Use of the ATSC Digital Television Standard, pp. 102-136 (Oct. 4, 1995).

Samueli et al., "A 60-MHz 64-Tap Echo Canceller/Decision-Feedback Equalizer in 1.2-μm CMOS for 2B1Q High Bit-Rate Digital Subscriber Line Transceivers", IEEE 1991 Custom Integrated Circuits Conference, May 1991, pp. 7.2.1-7.2.4.

Tan et al., "A 200-MHz Quadrature Digital Synthesizer/Mixer in 0.8-μm CMOS", IEEE 1994 Custom Integrated Circuits Conference, May 1994, pp. 4.4.1-4.4.4.

Tan et al., "An 800MHz Quadrature Digital Synthesizer with ECL-Compatible Output Drivers in 0.8 μm CMOS", 1995 IEEE International Solid-State Circuits Conference, Feb. 1995, pp. 258-259 and p. 376.

Tan et al., "A 70-Mb/s Variable-Rate 1024-QAM Cable Receiver IC with Integrated 10-b ADC and FEC Decoder", IEEE Journal of Solid-State Circuits, vol. 33, No. 12, Dec. 1998, pp. 2205-2218.

Gu, Yonghai et al., "Adaptive Combine DFE/MLSE Techniques for ISI Channels", Jul. 1996, IEEE Transactions on Communications, vol. 44, Issue 7, pp. 847-857.

* cited by examiner $y(n) = \sum_k d(k)x(n-k)$

EQUALIZATION AND DECISION-DIRECTED LOOPS WITH TRELLIS DEMODULATION IN HIGH DEFINITION TV

CROSS-REFERENCE TO RELATED APPLICATIONS

This application is a continuation of application Ser. No. 09/433,733, filed Nov. 3, 1999, now U.S. Pat. No. 6,775,334 which claimed the benefit of the priority date of U.S. Provisional Applications Ser. Nos. 60/106,921, filed Nov. 3, 1998, Ser. No. 60/106,922, filed Nov. 3, 1998, Ser. No. 60/106,923, filed Nov. 3, 1998, Ser. No. 60/106,938, filed Nov. 3, 1998, Ser. No. 60/107,103, filed Nov. 4, 1998 and Ser. No. 60/107,037, filed Nov. 3, 1998, the entire disclosures of which are expressly incorporated herein by reference.

FIELD OF THE INVENTION

The present invention relates to systems for, and methods of, recovering digitally modulated television signals and, more particularly, to a dual mode QAM/VSB receiver system for recovering quadrature amplitude modulated or vestigial sideband modulated signals.

BACKGROUND OF THE INVENTION

Modern digital telecommunication systems are operating at ever-increasing data rates to accommodate society's growing demands for information exchange. However, increasing the data rates, while at the same time accommodating the fixed bandwidths allocated by the Federal Communications Commission (FCC), requires increasingly sophisticated signal processing techniques. Since low cost, small size and low power consumption are portent in the hardware implementations of such communication systems, custom integrated circuit solutions are important to achieving these goals.

Next generation digital television systems, such as cable transported television (CATV) and high-definition television (HDTV) rely on telecommunication transceivers to deliver data at rates in excess of 30 megabits per second (30 Mb/s). The ATSC A/53 Digital Television Standard, was developed by the "Digital HDTV Alliance" of U.S. television vendors, and has been accepted as the standard for terrestrial transmission of SDTV and HDTV signals in the United States. The ATSC A/53 standard is based on an 8-level vestigal sideband (8-VSB) modulation format with a nominal payload data rate of 19.4 Mbps in a 6 MHz channel. A high data rate mode, for use in a cable television environment, is also specified by the standard. This particular mode, defined in Annex D to the ITU-T J.83 specification, utilizes a 16-VSB modulation format to provide a data rate of 38.8 Mbps in a 6 MHz channel.

Transmission modes defined in ITU-T J.83 Annex A/C are used primarily outside the United States for digital cable television transmission. The transmission modes supported by this specification have been adopted in Europe as the Digital Video Broadcast for Cable (DVB-C) standard, and further adopted by the Digital Audio-Video Council (DAVIC) with extensions to support 256-QAM modulation formats.

Beyond these divergent requirements, the ITU-T J.83 Annex B standards define the dominant methodology for digital television delivery over CATV networks in the United States. It has been adopted as the physical layer standard by various organizations including the SCTE DVS-031, MCNS-DOCSIS and the IEEE 802.14 committee.

Given the implementation of multiple modulation techniques in the various adopted standards, there exists a need for a television receiver system capable of receiving and demodulating television signal information content that has been modulated and transmitted in accordance with a variety of modulation formats. In particular, such a system should be able to accommodate receipt and demodulation of at least 8 and 16-VSB modulated signals in order to support US HDTV applications, as well as 64 and 256-QAM modulated signals, for European and potential US CATV implementations.

SUMMARY OF THE INVENTION

The present invention is directed to digital data communication systems and methods for operating such systems in order to improve the system's bit error rate in high noise situations. Decision directed adapted equalization, decision directed carrier and/or timing recovery loops are all able to recover significant performance improvements by employing maximum likelihood sequence estimation circuitry to provide a higher percentage of correct symbolic decisions. In particular, such systems are particularly beneficial in the case of U.S. Digital Terrestrial Television Broadcasting applications which employ a trellis coded 8-VSB modulation scheme.

In a first aspect of the invention, an integrated circuit receiver includes decision directed carrier and timing recovery circuits and further includes a decision feedback equalizer. The decision feedback equalizer is constructed with a feedforward filter and a decision feedback filter and incorporates a trellis decoder circuit, coupled to receive symbol samples from the feedforward filter and channel perturbation compensation signals from the decision feedback filter. The trellis decoder circuit is also integrated into the timing loops so as to provide enhanced reliability symbolic decisions to an input of the timing loops.

The trellis decoder includes a decision device, a path metrics module which defines and stores path metrics for a sequential series of symbolic decisions, and a traceback memory module which stores best survivor paths for a sequential series of symbolic decisions. The traceback memory has a length N, the Nth decision representing a final decision and the length N represents a N stage trellis defined path memory, each stage having a time delay characterized by 1/N. A summing circuit is coupled in parallel fashion across the trellis decoder. The summing circuit combines an input symbol, input to the trellis decoder, with a symbolic decision, output from the trellis decoder, to define a sequence estimated error term. A variable delay stage is coupled to delay the input symbol by an amount equal to the delay introduced to an output decision by an action of the trellis decoder.

In a further aspect of the invention, the feedforward filter includes adaptively updateable coefficient taps. The decision feedback filter further includes adaptively updateable coefficient taps. The sequence estimated error term is provided to the feedforward filter and to the decision feedback filter in order to drive the tap updates in a more error free manner.

Increased performance and reliability of both the decision feedback equalizer and timing recovery loops are further achieved by optimizing the tradeoff between trellis decoder symbolic decision delay and symbolic decision reliability. In particular, using decisions closer to the Nth decision increases the reliability of a particular decision. However, increasing delay in a timing recovery loop, by using a symbolic decision closer to the Nth decision, reduces the loop's bandwidth and tracking ability. Accordingly, various intermediate symbolic decisions, less than the Nth decision, are selectively provided to the various timing recovery loops in order to recover some degree of sequence estimated decision performance with a minimum of delay consequence. Other intermediate symbolic decisions, or a final symbolic decision, is provided to the DFE in order to maximize performance.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
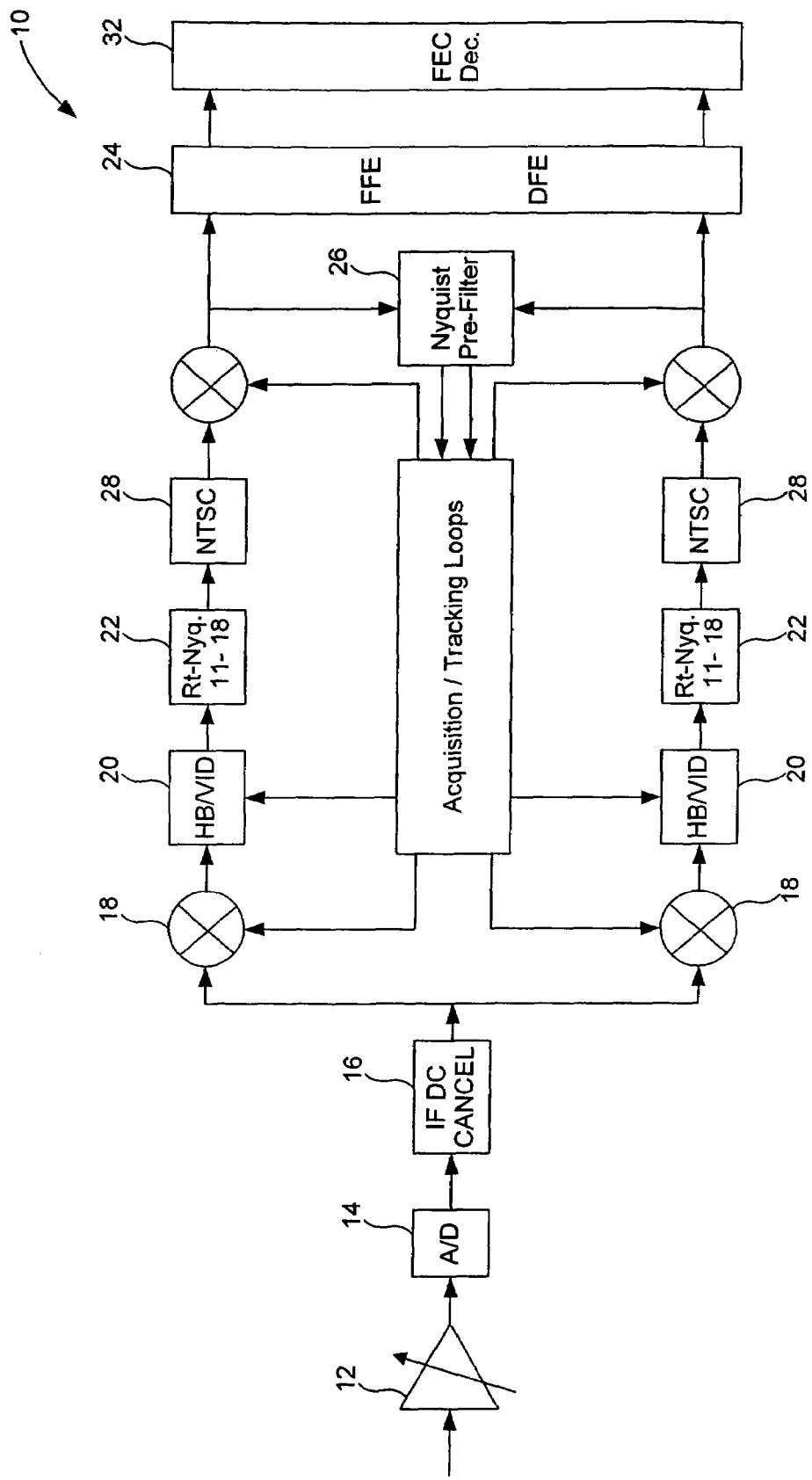
FIG. 1 is a simplified, semi-schematic block diagram of a dual mode QAM/VSB receiver architecture in accordance with the invention.

One particular aspect of the present invention might be implemented in a dual mode QAM/VSB receiver system such as illustrated in simplified, semi-schematic block diagram form in FIG. 1. The receiver system illustrated in FIG. 1 can be described as a digital receiver which is compatible with both North American digital cable television and digital terrestrial broadcast television standards. The receiver system of FIG. 1 is capable of receiving all standard-definition and high-definition digital television formats (SDTV/HDTV).

In accordance with principles of the invention, the receiver system depicted in FIG. 1 accepts an analog signal centered at standard television IF frequencies, amplifies and digitizes the input analog signal with an integrated programmable gain amplifier and 10-bit A/D converter. Digitized signals are demodulated and filtered with a combined 64/256-QAM and 8/16-VSB demodulator and are adaptively filtered to remove multipath propagation effects and NTSC co-channel interference. The resulting digital data is error corrected with integrated trellis and Reid-Solomon decoders which support both the ATSC A/53 and ITU T J.83 Annex A/B/C coding formats. The final receive data stream is delivered in either parallel or serial MPEG-2 transport format for displaying on a television screen. It should be noted that the receiver system of FIG. 1 is suitable for digital CATV/HDTV set-top box applications as well as digital CATV/HDTV televisions.

In the exemplary embodiment of the receiver of FIG. 1, all clock, carrier, gain acquisition and tracking loops are integrated with the demodulation and decoding functionality on a single integrated circuit chip, as are the necessary phase-locked-loops, referenced to a single external crystal.

The analog front end of the dual mode QAM/VSB receiver of FIG. 1, indicated generally at 10, suitably includes a programmable gain amplifier (PGA) 12 and a 10-bit analog-to-digital (A/D) converter 14. The PGA 12 is controlled by an on-chip gain recovery loop, operating in conventional fashion, to implement an automatic gain control (AGC) function. The A/D converter 14 is clocked by an on-chip voltage controlled oscillator (VCO) which is locked to an off-chip crystal resonator functioning as a stable timing reference. This stable reference allows an input intermediate frequency (IF) signal to be subsampled in order to produce a digital data stream centered on a substantially lower IF center frequency.

Digressing momentarily, it should be noted that the dual mode QAM/VSB receiver of FIG. 1 contemplates supporting two modes of IF input signals, direct sampling of a QAM spectrum centered on a low IF, or subsampling of a QAM spectrum centered on a standard tuner IF frequency of 44 Megahertz (MHz). In low IF mode, the output of a conventional tuner is first passed through a 6 MHz SAW filter centered on the tuner IF frequency to limit out-of-band signal energy. The differential SAW output is then AC coupled to a conventional downconversion circuit which centers the QAM spectrum on a low IF such as 6 MHz, and amplifies it under control of the AGC 12 to provide a nominal 1.0 volt peak-to-peak signal.

Returning now to the exemplary embodiment of FIG. 1, the dual mode QAM/VSB receiver according to the invention further includes an IF DC offset cancellation circuit 16 which compensates for any DC shift introduced by the A/D circuit 14. A complex mixer 18 subsequently converts IF sample data into baseband data and is controlled by a direct digital frequency synthesizer (DDFS) driven by the carrier frequency recovery loop in a manner to be described in greater detail below.

The QAM/VSB receiver's demodulator section suitably incorporates the complex digital mixer 18 and a multi-rate filter/interpolator (HB/VID) 20 which in combination, converts an over sampled IF input signal to a baseband complex data stream which is correctly sampled in both frequency and phase, under control of a clock recovery loop, in a manner to be described in greater detail below.

In-phase (I) and quadrature phase (Q) baseband signals are then filtered by square-root Nyquist filters 22 which can accommodate roll-off factors of 11-18%. The outputs of the square-root Nyquist filters are subsequently directed to an adaptive equalization block 24 and are parallel-processed by a Nyquist-type prefilter 26 to provide an input signal to an acquisition/tracking loop circuit 28 which includes carrier recovery loop circuitry to support carrier frequency recovery and spectrum centering as well as baud recovery loop circuitry, for symbol timing extraction, as will be described in greater detail below.

Prior to being directed to the Nyquist prefilter 26 and adaptive equalization block 24, filtered signals are provided from the square-root Nyquist filter 22 to an NTSC co-channel interference rejection filter 28, for removal of the luma, chroma, and audio subcarrier signals from the frequency spectrum. When used in a terrestrial environment, there exists the possibility of co-channel interference from terrestrial-type NTSC transmitters. The NTSC co-channel rejection filters 28 function as an adaptive digital filter which places precisely located notches in the frequency spectrum at the specific locations of the NTSC luma, chroma, and audio subcarriers. An NTSC co-channel rejection filter suitable for implementation in connection with the dual mode QAM/VSB receiver system of FIG. 1, might be one such as described in co-pending patent application Ser. No. 09/303,783, filed, May, 11, 1999 and entitled "NTSC REJECTION FILTER", commonly owned by the Assignee of the present invention, the entire disclosure of which is expressly incorporated herein by reference.

While the square-root Nyquist filters 28 ordinarily assure that there is a minimal inter-symbol interference (ISI) over a perfect channel, the Nyquist filters are unable to remove ISI due to the imperfect channel characteristics. Accordingly, the dual mode QAM/VSB receiver according to the invention, provides an adaptive, multi-tap decision directed equalizer circuit 24, having 64 feedforward taps and 432 feedback taps, which is sufficient to remove ISI components generated by worst-case coaxial cable and terrestrial broadcast channels with multi-path spreads of up to 40 μsec at 10.76 Mbaud.

Blind convergence algorithms are utilized by the equalizer 24 along with an ability to implement a training sequence embedded in the incoming data stream. In addition to adaptive equalization, the decision directed equalizer 24 also includes particular circuitry to perform carrier frequency acquisition and phase tracking (in the case of QAM modulation) or carrier phase tracking (phase recovery in the case of VSB modulation) on equalized constellation points using a quadrature synthesizer and complex mixer under control of the carrier recovery loop, to track out residual carrier offsets and instantaneous phase offsets such as are caused by tuner microphonics, as will be described in greater detail below.

The dual mode QAM/VSB receiver exemplified in FIG. 1 further includes a forward error correction (FEC) and decoder block 32, which is compatible with all common CATV standards and the ATSC terrestrial broadcast standard. Specifically, the Annex A/C decoder circuitry implements four general functions, frame synchronization, convolutional deinterleaving, reed-Solomon error correction and derandomization. Hard decisions are input to the frame synchronizer which locks onto the inverted synch byte pattern, conventionally provided in television data frames. After synchronization, data interleaving is removed by a convolutional deinterleaver utilizing a Ramsey type III approach. Data symbols are next provided to a Reed-Solomon decoder, which is able to correct up to 8 symbol errors per RS block, followed by data derandomization to undo the corresponding randomization operation of the transmitter's modulator.

In the Annex B mode, the decoder typically performs five general functions, and differs from the Annex A/C case primarily in its use of trellis decoding. Soft decisions from the receiver's equalizer circuit are input to a trellis decoder which functions as a maximum likelihood sequence estimator. Output sequences are directed to a frame synchronizer and derandomization block, similar to those described above, in connection with Annex A/C decoding. Data then is directed to a Reed-Solomon decoder block which is capable of correcting 3 symbol errors per RS block. A checksum decoder identifies blocks with uncorrectable errors and flags an output MPEG-2 data stream with a Transport Error Indicator (TEI) flag.

In practice, the majority of communication with the dual mode QAM/VSB receiver 10 of FIG. 1, and the majority of the activity provided by the various functional blocks, takes place upon initiation of a channel change. Upon detection of a channel change request, a receiver system's host microprocessor determines whether the existing 6 MHz channel contains the requested MPEG service or if another channel must be selected. In the latter case, the host microprocessor typically consults its program table and might direct the receiver system to program a channel tuner to select the appropriate channel frequency. The host microprocessor might then download, to the receiver 10, any channel specific configuration that might be required, such as the configuration of the receiver and FEC 32 for reception of either a terrestrial (VSB) or a cable (QAM) channel.

Following configuration download the receiver 10 must acquire lock, i.e. synchronize its acquisition and tracking loop circuitry 30 to the frequency and phase of a remote transmitter. Receiver lock is a multi-step process which generally involves allowing the various acquisitions/tracking loops to acquire lock in a predetermined manner. For example, the AGC loops are generally allowed to acquire first, in order to ensure that the signal level at the input to the A/D converter 14 is set appropriately. AGC bandwidths are initially set wide open in order to minimize acquisition time and subsequently reduced to provide adequate tracking and minimal noise.

Carrier frequency acquisition and symbol timing (baud timing) are typically enabled after the AGC loops have acquired lock. Depending on the particular mode of operation (QAM or VSB), these may be obtained jointly or in sequence. In a manner to be described in greater detail below, each loop is allowed to acquire by widening the appropriate bandwidths, thus allowing the loops to pull-in the signal, and gradually reducing the bandwidth as lock is obtained. Once baud timing and carrier frequency is acquired, a carrier phase loop is enabled. While the carrier frequency loop is typically able to obtain a course phase lock, its ability to track instantaneous phase noise is compromised. A carrier phase loop provides a superior ability to track out phase noise. Once the receiver system 10 has obtained lock, recovered data is delivered to the FEC decoder 32. The FEC 32 first obtains node synchronization (if there is a trellis decoder in the selected coding scheme), following by frame synchronization. With frame synchronization achieved, derandomization and deinterleaving are performed along with Reid-Solomon decoding. MPEG-2 transport stream synchronization is then achieved and data is delivered to the output for display.

The carrier frequency/phase recovery and tracking loops are all-digital loops which simultaneously offer a wide acquisition range and a large phase noise tracking ability. In accordance with the present invention, the loops use both pilot tracking and decision directed techniques in order to estimate the angle and direction for phase/frequency compensation. The loops are filtered by integral-plus-proportional filters, in which the integrator and linear coefficients of the filter are programmable to provide means for setting loop bandwidths. The baud recovery loop includes a timing error discriminant a loop filter, and digital timing recovery block which controls a digital resampler. As was the case with the carrier loops, the baud loop's timing error discriminant outputs a new value each baud which is filtered by a digital integral-plus-proportional filter featuring programmable coefficients.

In accordance with the present invention, the dual mode QAM/VSB receiver system 10 of FIG. 1 is configureable to be operable with both North American digital cable television (QAM) and digital terrestrial broadcast television (VSB) standards as well as performing in a dual QAM/VSB mode, it should further be understood that VSB broadcasts might be one of two separate types, a first, terrestrial broadcast mode (referred to as 8 VSB) which supports a payload data rate of about 19.28 Mbps in a 6 MHz channel, and a second, high data rate mode (referred to as 16 VSB) which supports a payload data rate of about 38.57 Mbps. Both of these modes are well understood and described in the ATSC digital television standard, put forth by the advanced television systems committee. VSB transmission inherently requires only processing an in-phase (I) channel signal which is sampled at the symbol rate. In contrast, QAM transmission requires that the receiver process both in-phase (I) channel signals and quadrature-phase (Q) channel signals which are sampled at its symbol rate, typically one half that of a comparable VSM.

Figure 2:
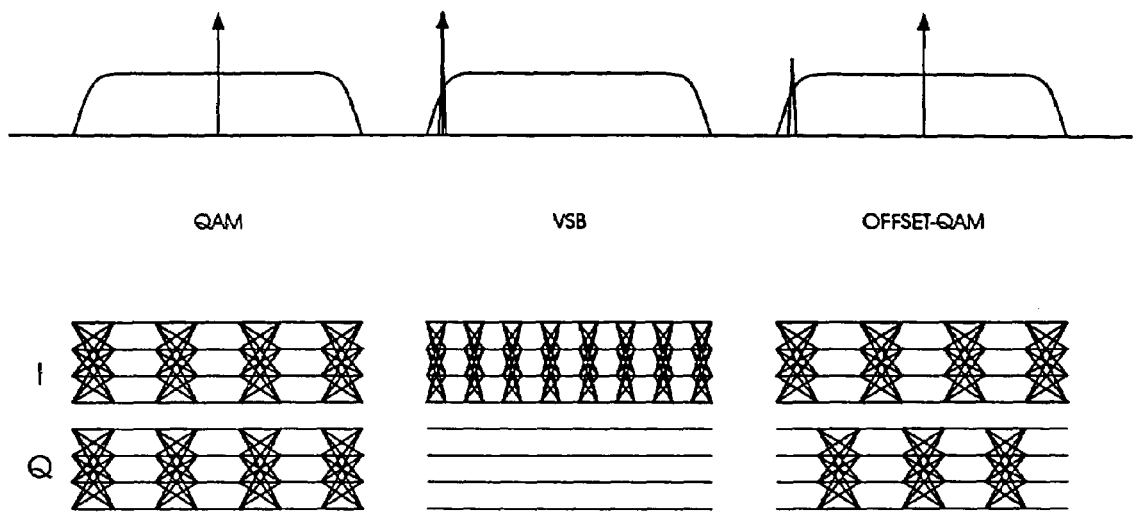
FIG. 2 is a graphical representation of QAM, VSB and offset-QAM spectra subtended by their respective eye diagrams illustrating both the I and Q rails.

A comparison of the spectral distribution of QAM modulated signals and VSB modulated signals is illustrated in FIG. 2. Each of the spectra, for the QAM and VSB cases, are subtended by an "eye" diagram illustrating the signal content for both the I and Q rails. Although the VSB spectrum might be viewed as the sum of a real spectrum and its Hilbert transform, the VSB spectrum might further be considered as a frequency shifted Offset-QAM (OQAM) spectrum. Accordingly, the dual mode QAM/VSB receiver 10 of FIG. 1 is configured, when in VSB mode, to treat VSB modulated signals as either VSB or as OQAM, depending on the desires of the system configuration engineers.

Figure 3:
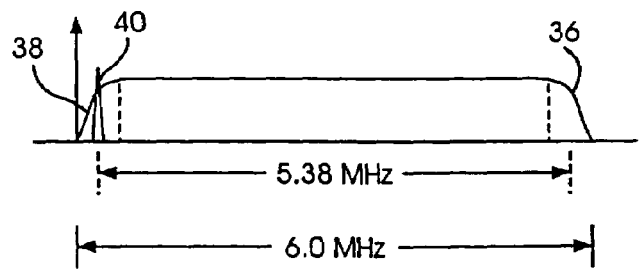
FIG. 3 illustrates a typical 6 MHz spectra represented as a raised cosine waveform illustrating transition regions and the location of a pilot signal.

FIG. 2 includes an Offset-QAM spectrum subtended by its corresponding "eye" diagram, in which the distinctive feature of OQAM is evident. In particular, signals on the Q rail are delayed by one half of a symbol, thus offsetting the Q rail, in time, from information on the I rail. As can be seen in the VSB and OQAM spectra of FIG. 2, and as more particularly evident in the VSB channel occupancy diagram of FIG. 3, the spectrum occupying a nominal 6.0 MHz channel is generally flat, except for symmetrical band edge regions where a nominal square root raised cosine response results in 620 kHz transition regions 36 and 38. A pilot signal 40, typically a 50 kHz pilot signal, is added to the spectrum by a pilot insertion circuit, implemented in accordance with the standard, in all transmitters. The pilot signal 40 is typically provided at a spectral position, 310 kHz from the lower band edge, that was reserved for the suppressed carrier signal in conventional NTSC transmissions. This suppressed carrier signal provided a frequency reference signal to which NTSC receivers could lock and which was used for carrier recovery. The pilot is also termed "pilot tone" and (misleadingly) "carrier".

Carrier recovery is conventionally performed by an FPLL synchronous detector, which integrally contains both the frequency loop and a phase-locked loop in one circuit. The frequency loop provides wide frequency pull-in range of approximately +/−100 kHz while the phase-locked loop might be implemented with a narrower bandwidth, i.e., typically less than 2 kHz. Further, in the ATSC digital television standard, the recommended approach to recover symbol timing information is to utilize a data segment sync signal that makes up a VSB data segment, and which is inserted between every segment of 828 symbols. The repetitive data segment sync signals are detected from among synchronously detected random data by a narrow bandwidth filter. From the data segment sync signals, a properly phased 10.76 MHz symbol clock is conventionally created.

In accordance with the present invention, the dual mode QAM/VSB receiver 10 of FIG. 1 recovers timing information from the pilot (unsuppressed carrier) signal that is included with the VSB signal, whereas the ATSC specification intends that the pilot signal be used only for carrier recovery.

Figure 4:
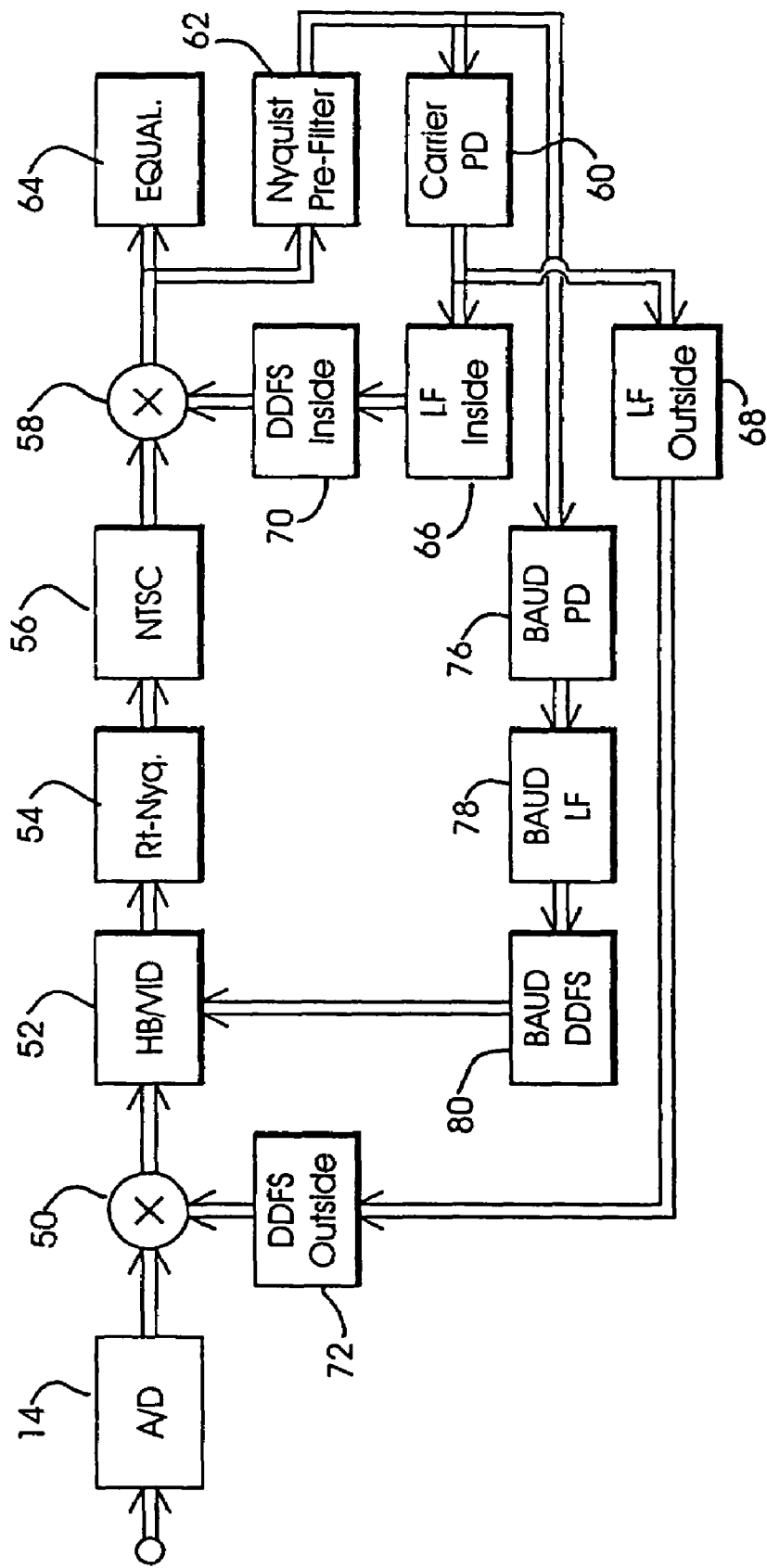
FIG. 4 is a simplified, semi-schematic block diagram of the architecture of carrier recovery and baud loops of a dual mode QAM/VSB receiver in accordance with the invention.

Turning now to FIG. 4, there is depicted in simplified, semi-schematic block diagram form, an exemplary embodiment of a unitary carrier and recovery and symbol timing loop architecture, termed "unitary" in that both functions, frequency acquisition and tracking and symbol timing (also termed "baud recovery") are operable in response to the pilot (unsuppressed carrier) signal. In the embodiment of FIG. 4, an input IF spectrum is digitized by an analog-to-digital converter (A/D) and the resulting digital complex signal is directed to a complex mixer 50 where it is combined with a complex signal having a characteristic frequency $f_C$ equal to the carrier frequency. The resulting complex signal is processed by a highband filter and variable rate interpolator, represented as a single processing block in the embodiment of FIG. 4, and denoted HB/VID 52. In a manner to be described in greater detail below, symbol timing is performed by a baud loop coupled to provide symbol timing information to the variable rate interpolator (VID) portion of the HB/VID filter 52. Following interpolation, baseband IF signals are processed by a square root Nyquist filter which has a programmable roll off α of from about 11 to about 18%. The square root Nyquist filter 54 is further designed to have a particular cutoff frequency that has a specific relationship to the VSB pilot frequency $f_C$, when the VSB spectrum centers at DC. In a manner to be described in greater detail below, this particular cutoff frequency is chosen to have this particular relationship in order that both carrier recovery and symbol timing recovery might be based on a VSB pilot frequency enhancement methodology.

An NTSC rejection filter 56 is provided in the signal path in order that interference components represented by the luma, chroma and audio subcarriers, present in NTSC terrestrial broadcast system signals, are removed from the digital data stream prior to the data being directed to the receiver system's equalizer. The NTSC rejection filter 56 is an all digital, programmable notch filter, exhibiting quite narrow notches at specific, predetermined frequencies that correspond to the luma, chroma and audio subcarrier peaks. Although the NTSC rejection filter 56 is contemplated as functioning to remove unwanted NTSC co-channel interference components, the characteristics and design of the NTSC rejection filter 56 are such that it may be used to remove any form of interference component having a deterministic relationship to a particular input spectrum.

Following the filter bank, the input baseband signal is directed to a second mixer 58 where it's combined with a correction signal, developed in a manner to be described in greater detail below, which ensures that the spectrum is appropriately centered about zero.

It will thus be understood that there are two stages to carrier acquisition, a first stage, termed "an outside stage" (or outside loop) provides for mixing the received digitized spectrum down to baseband and which might properly be termed "a tracking loop", and a second correction stage, termed "an inside loop", which functions more as an acquisition loop and which provides a correction factor to the spectrum to make sure the spectrum is properly centered. In addition, the correction factor is "leaked" from the inside loop to the outside loop in order that the inside loop might be constructed with a wide bandwidth, typically in the 100 kHz range in order to provide for fast acquisition. Correction factors are leaked to the outside loop such that the outside loop might be constructed with a relatively narrow bandwidth in order to provide for more accurate tracking capability. Once the carrier has been acquired.

A carrier phase detector 60 is coupled to receive an input signal from a Nyquist prefilter 62 coupled in turn to receive complex signal from a node between the second mixer 58 and the receiver's equalizer 64. The Nyquist prefilter 62 is constructed as a high pass filter with a cutoff at the same particular characteristic frequency as the cutoff designated for the low pass root Nyquist filter 54. The root Nyquist filter 54 and Nyquist prefilter 62 function in combination to define an equivalent filter that acts to define the pilot enhanced timing recovery characteristics of the receiver in accordance with the present invention. Complex, pre-filtered signals are directed to the input of the carrier phase detector which produces a 6-bit frequency error discriminant for use in the loop. The SGN function of these 6-bits are extracted and applied, simultaneously, to an inside loop filter 66 and an outside loop filter 68. The inside loop filter 66 drives an inside timing reference circuit, such as a direct digital frequency synthesizer (DDFS) which might also be implemented as a voltage controlled oscillator (VCO) or a numerically controlled oscillator (NCO). Likewise, the outside loop filter 68 drives an outside timing reference circuit 72 which might also be suitably implemented as a DDFS, VCO, or an NCO. As was mentioned previously, the outside, or centering, loop functions to define a complex signal that might be expressed as $\sin \Omega_{Ct}$ and $\cos \Omega_{Ct}$, where $\Omega_C$ represents the pilot (carrier) frequency. Since the pilot (carrier) frequency $f_C$ is given, its position in the frequency domain, with respect to any sampling frequency $f_S$ is deterministic. Therefore, if a receiver system wishes to lock its timing frequency to a particular $F_S$ that has a fixed relationship with a known $F_C$, as in the case of the ATSC standard signals, it need only apply a phase lock loop that tracks the pilot. Axiomatically, the pilot signal will appear at the correct location in the spectrum if the sampling frequency $F_S$ is correct. The pilot signal will be shifted to a lower frequency from its expected frequency location if the sampling frequency $f_S$ is too high. Conversely, in the case where the sampling frequency $f_S$ is too low, the pilot signal will appear to have been shifted to a higher frequency location from its expected frequency location in the spectrum.

Figure 5:
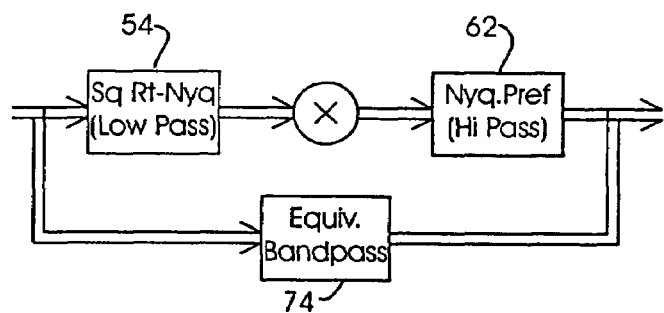
FIG. 5 is a simplified, semi-schematic block diagram of a square root Nyquist low pass filter in combination with a Nyquist high pass prefilter expressed as an equivalent bandpass filter.
Figure 6:
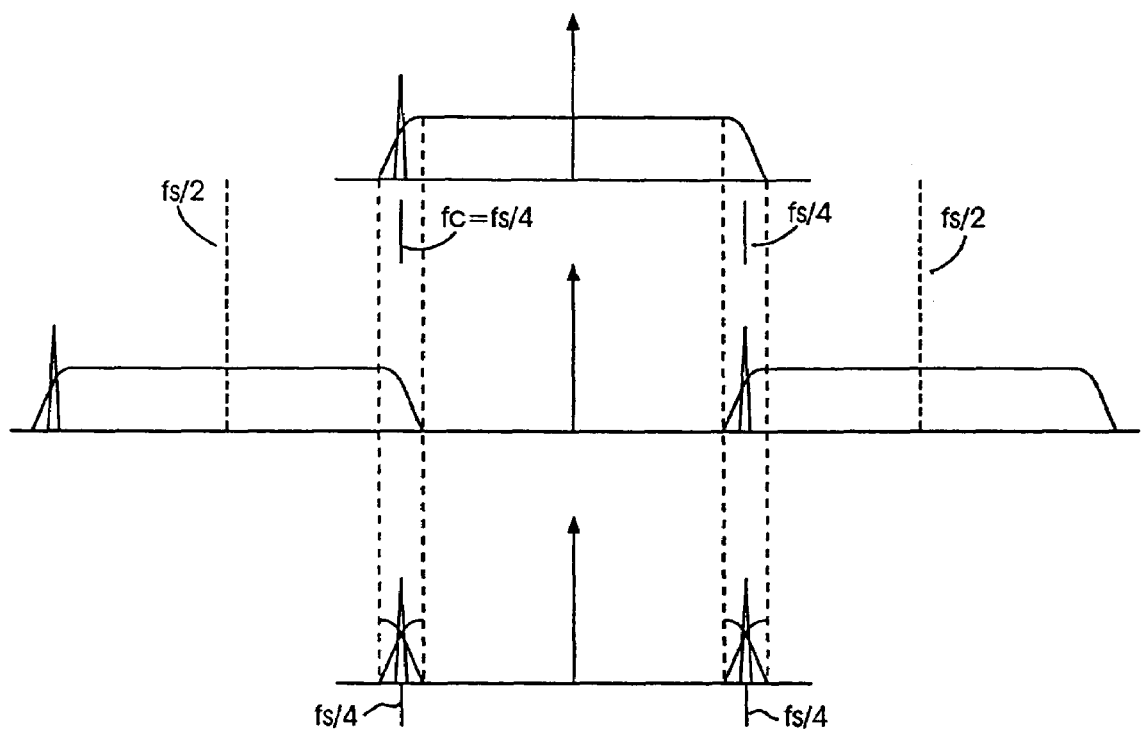
FIG. 6 is a graphical representation of the affects of the low pass, high pass and equivalent bandpass filters of FIG. 5 on an input spectrum, where the filter's cutoff frequencies have an integer relationship to the sampling frequency.

A particular case which makes implementation of pilot enhanced carrier recovery simpler, occurs when the sampling frequency $f_S$ is selected to be four times that of the pilot frequency $f_C$, when a VSB spectrum is centered at zero. Thus, when the spectrum is centered, the pilot signal will be expected to occur at $f_C$. In accordance with practice of the present invention, the inside and outside loops will be looking for the pilot to occur at a frequency of $f_S/4$. This particular implementation is illustrated in the semi-schematic block diagram of FIG. 5 and its corresponding spectrum diagrams of FIG. 6.

As mentioned previously, the receiver system incorporates a frequency modulated square root Nyquist low pass filter 54 in combination with a high pass Nyquist prefilter 62, which in combination might be viewed as a single equivalent filter 74. Both the root Nyquist 54 and Nyquist prefilter 62 are constructed with cutoff frequencies of $f_S/4$. Thus, and as indicated in the spectrum diagrams of FIG. 6, the high pass Nyquist prefilter 62 gives a resultant high and low band spectrum with each centered about $F_S/2$. When the spectra of the root Nyquist filter 54 and Nyquist prefilter 62 are superposed (summed as would be the case with an equivalent filter 74) the resultant signal is a symmetrical waveform, centered at $F_S/4$, each of which are centered about and symmetric with respect to the pilot when the pilot frequency $f_C$ is equal to $f_S/4$. Accordingly, since the pilot signal is designed to be centered within a spectrum's transition band, the combination of the root Nyquist filter 54 and Nyquist prefilter 62 define an equivalent filter 74 that provides an output signal symmetric about the pilot when the pilot (carrier) has been appropriately acquired. It will thus be understood that when the equivalent filter output is symmetric about the pilot $f_C$, the resulting waveform can be represented as a pure sinusoidal signal for which only zero crossings need to be evaluated by the carrier phase detector (60 of FIG. 4). If the sampling frequency $f_S$ is too high, not only will the pilot signal be observed to appear at a lower frequency than its expected frequency location, but also the symmetry of the resultant waveform from the "equivalent" filter 74 will also be disturbed due to the non-center placement of pilot. Likewise, when the sampling frequency $f_S$ is too low, the pilot signal will be observed to appear at a higher frequency than its expected frequency location, also perturbing the symmetry of the equivalent filter's output in a direction opposite the previous case. The carrier phase detector (60 of FIG. 4) evaluates the position of the pilot with respect to the sampling frequency and provides appropriate correction signals to the inside loop filter (66 of FIG. 4) and the outside loop filter (68 of FIG. 4).

During initialization, one is able to make certain assumptions about the pilot signal since its frequency $f_C$ position with respect to the spectrum is deterministic. Accordingly, while the inside or acquisition, loop is acquiring the pilot, the outside, or centering, loop assumes that no frequency offset has been introduced to the spectrum and runs the DDFS (or VCO, or NCO) in a "flywheel" mode. Since the IF input signal is centered at 6 MHz, the outside timing reference (72 of FIG. 4) also runs at 6 MHz until such time as the inside loop is able to acquire the carrier and "leak" any frequency offset information so obtained to the outside loop filter (68 of FIG. 4) for developing appropriate control signals for the outside loop's timing reference (72 of FIG. 4).

Returning now to FIG. 4, the Nyquist prefilter 62 further provides a complex input signal to a baud loop (also termed "symbol timing loop") which provides symbol timing information to the variable rate interpolator 52. The baud loop suitably includes a baud phase detector circuit 76 coupled, in turn, to a baud loop filter 78 which controls operation of a baud timing generation circuit 80 such as a DDFS, VCO or NCO.

Figure 7:
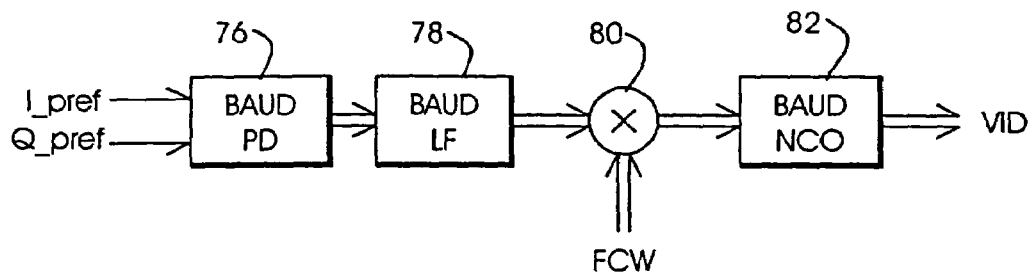
FIG. 7 is a simplified, semi-schematic block diagram of a baud loop as might be implemented in a dual mode QAM/VSB receiver architecture in accordance with the invention.

A further implementation of a baud loop is illustrated in the simplified semi-schematic top level block diagram of FIG. 7. The implementation of the baud loop depicted in FIG. 7 is generally similar to that depicted in the acquisition and tracking loop diagram of FIG. 4, and suitably includes a baud phase detector coupled to receive complex signals I_pref and Q_pref from the Nyquist prefilter. The baud phase detector 76 might be implemented as a timing error discriminant which outputs a new value each baud, in turn, filtered by a digital integral-plus-proportional low pass filter 78. The filtered signal is summed at a summing node 80 with an offset word, denoted "baud frequency control word" or SCW, and is used to control operation of a baud numerically controlled oscillator (NCO) 82. The loop is updated once per baud, but only if a sine change occurred on either the I or Q decision data since the previous baud. The summing node 80 and frequency control word are provided in order to accommodate the baud loop to any known offsets that might, for example, have been acquired from past history of communication between the receiver and a particular remote transmitter unit.

Figure 8:
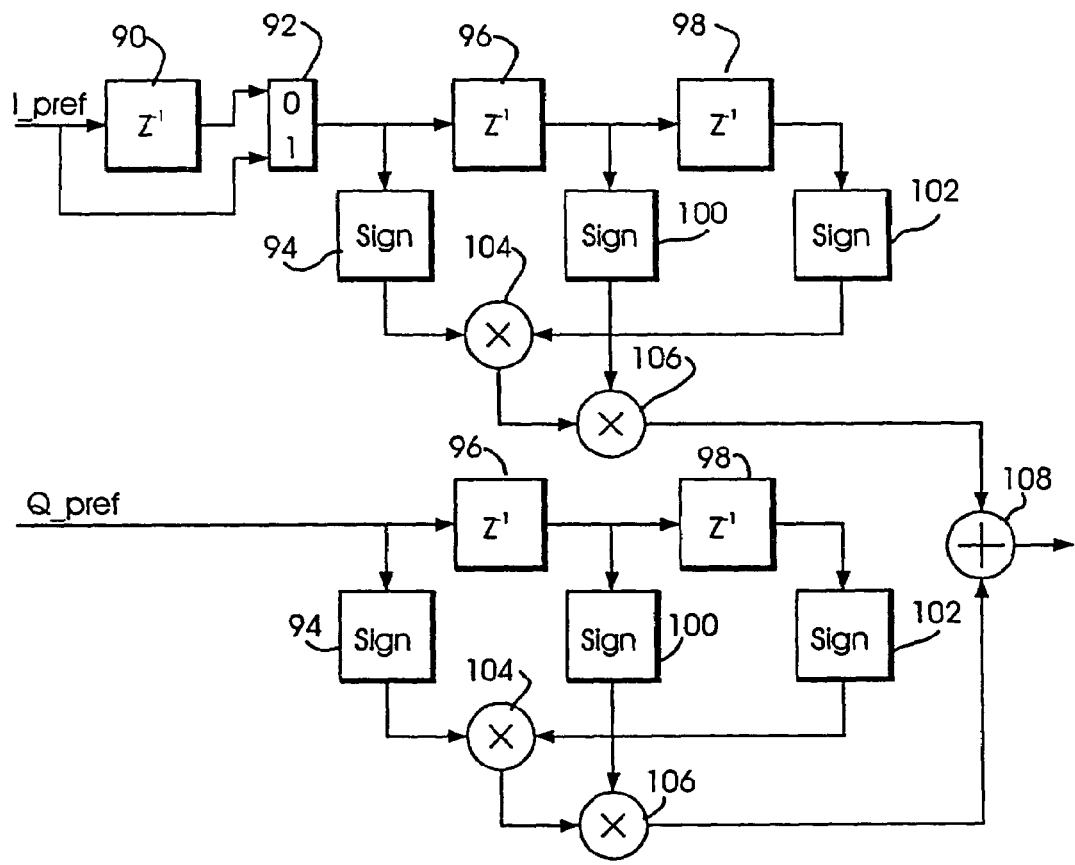
FIG. 8 is a simplified, semi-schematic block diagram of a phase detector as might be implemented in the baud loop of FIG. 7.

FIG. 8 is a semi-schematic block diagram of an exemplary implementation of the baud phase detector 76 of FIG. 7. In the exemplary embodiment of a baud phase detector of FIG. 8, the input to the baud loop is the complex signal output by the Nyquist prefilter, I_pref and Q_pref. The signal from the I rail might either be offset by one symbol period through a delay element 90 or alternatively, be provided directly to the remaining circuit elements of the baud phase detector through a selection MUX 92. In the case where the baud phase detector is processing a VSB signal, one symbol delay is added for signals on the I rail. In the case where the baud phase detector is processing QAM signals, there is no need to add a symbol delay for either of the I or the Q rail, since the I and Q components of a symbol are aligned within a symbol period. It should also be noted that when VSB signals are being processed as OQAM, a one symbol delay is added to the signals on the I rail by passing the I signals through the delay element 90. Delay selection is made by the MUX 92 in response to a QAM/OQAM (VSB) signal provided by an off-board control microprocessor.

After input, the sign of the symbols on the I and Q rails is determined by a first sign logic circuit 94. The sign of the input symbols is mixed in mixer 104 with the output of a second sign logic circuit 102 which determines the sign of signals appearing on the I Q rails after they have been directed through two sequential delay elements 96 and 98. A third sign logic circuit 100 disposed between the two delay elements 96 and 98 provides an output signal to a second mixer 106 where it is combined with the output of the first mixer 104. The output of the second mixer 106, for both the I and Q signal paths, is summed by a summing circuit 108 and provided to the baud loop's low pass filter (78 of FIG. 7). It will be understood that the baud loop is updated once per baud, but only if a sign change occurred on either the I or Q decision data since the previous baud. The signs of the two previous symbols are evaluated by sign logic circuitry 100 and 102, while the sign of the present symbol is evaluated by sign logic circuitry 94. For example, if two sequential symbols exhibited particular phase relationships such that they might be characterized as rotated in a positive direction (i.e., having a positive sign), and a subsequent symbol exhibiting a phase rotation in the opposite direction (having a negative sign), the combination of the signs of the first and third symbols would combine in mixer 104 to give a negative, and combined in mixer 106 with the sign of the second symbol to further result in a negative. This result would indicate a transition from the prior symbol's phase relationships and be therefore directed to the loop filter for control of the baud NCO. The timing error discriminant, as represented by the signals output by the summing junction 108, is therefore represented by values of −1, 0 or +1, with 0 representing either of the case where I and Q are aligned in time and in phase, or the case where I and Q are not aligned with one another, regardless of their phase relationship with nominal. In this last case, unalike symbols are not necessarily indicative of baud timing, but rather another form of error which it is not the function of the baud loop to compensate.

Returning momentarily to the simplified architectural illustration of an exemplary embodiment of the dual mode QAM/VSB transceiver of FIG. 1, it will be understood that while the square root Nyquist filters 22 will assure that there is no intersymbol interference (ISI) over a perfect channel, they are unable to remove ISI components due to imperfect channel characteristics. Accordingly, After the filter block represented by the HB/VID 20, root Nyquist 22 and NTSC 28 filters, the dual mode QAM/VSB receiver provides a decision directed equalizer, incorporating both a feedforward equalizer and decision feedback equalizer for removing such ISI components. In the exemplary embodiment, the adapted equalizer 24 might be constructed as a 496-tap decision directed equalizer with 64-real/16-complex feedforward (FFE) taps and 432-real/108-complex feedback (DFE) taps, which is sufficient to remove ISI generated by worst-case coaxial cable and terrestrial broadcast channels. In addition to adaptive equalization, the adaptive equalizer 24 also includes circuitry for performing phase recovery on equalized constellation points, by using a quadrature synthesizer and complex mixer under the control of a carrier recovery loop, in order to track out residual carrier offsets and instantaneous phase offsets such as are caused by tuner microphonics. Further, the adaptive equalizer 24 is implemented such that the same hardware is configureable for either QAM or VSB applications, with a complex implementation being used for QAM and a real implementation being used for VSB.

In the case of QAM modulated signals, both carrier frequency and phase recovery is performed by circuitry contained within the adaptive equalizer block 24. In the case of VSB modulated signals, the equalizer section further includes circuitry for performing carrier phase recovery. In particular, since the adaptive equalizer incorporates decision directed circuitry, it is quite amenable to decision directed recovery techniques. For QAM, I and Q are coincident in time, so if I and Q are mixed, both the decision vector and phase offset are directly obtainable.

For VSB (or OQAM), I and Q are offset from one another by one symbol period. Accordingly, some phase rotation metric must be defined before I and Q are directed to the equalizer. As was described above, in connection with FIG. 8, the baud loop artificially puts I and Q in phase, by action of the initial delay stage (90 of FIG. 8) disposed on the I rail.

Figure 9:
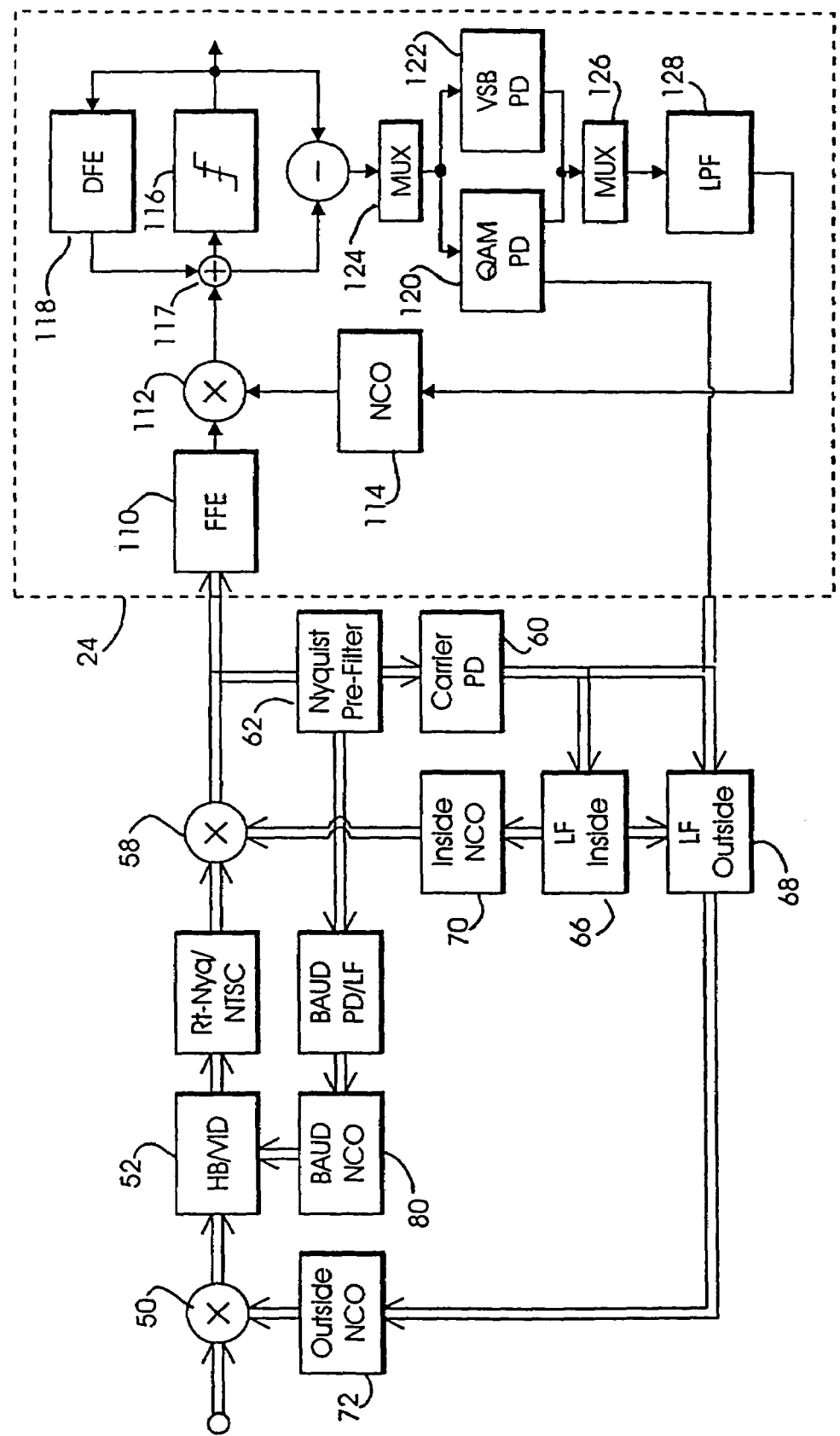
FIG. 9 is a simplified, semi-schematic block diagram of a dual mode QAM/VSB receiver architecture, including decision directed carrier phase tracking circuitry in accordance with the invention.

Turning now to FIG. 9, there is depicted a simplified, semi-schematic block level diagram of the exemplary dual mode QAM/VSB receiver, including details of the construction and arrangement of adaptive equalizer 24 having decision directed VSB phase tracking and decision directed QAM frequency acquisition and phase tracking loops in accordance with the present invention. As illustrated in the embodiment of FIG. 9, the adaptive equalizer includes a feedforward (FFE) block 110 configured to receive symbol aligned complex signals centered in baseband. The FFE 110 is suitably constructed as either a 64-tap real FFE, for VSB applications, or a 16-tap complex FFE when used in connection with QAM modulated signals. Carrier phase alignment and/or carrier frequency/phase alignment is performed in a mixer 112 which receives signals from the FFE 110 and combines them with a timing reference signal developed by a timing reference circuit 114 such as a numerically controlled oscillator (NCO) a voltage controlled oscillator (VCO) or a direct digital frequency synthesizer (DDDFS). Timed signals are then provided to a slicer 116 operating in conjunction with a decision feedback (DFE) block 118 which, in combination, provide hard decision information on constellation states as well as error information relating to differences between actual signal trajectory relative to an ideal signal trajectory.

Error signals developed in the equalizer are directed through either a QAM phase detector 120 or a VSB phase detector 122 depending on how the incoming signal has been modulated. Choosing between the QAM phase detector 120 and VSB phase detector 122 is a function of a multiplex circuit 124 operating in response to a QAM/VSB control signal provided by an off-chip microprocessor. A second multiplex circuit 126 couples the output of the QAM phase detector 120 and VSB phase detector 122 to a low pass filter 128 which, in turn, develops control signals for the timing reference circuit 114. Thus, the dual mode QAM/VSB receiver can be characterized as having four separate and distinct timing loops, operative in various combinations depending on whether the incoming signal is VSB or QAM.

In particular, the multiple loop timing system includes a first loop, also termed an inside loop, suitably including the Nyquist prefilter 62, carrier phase detector 60, an inside loop filter 66 and an inside timing generation circuit 70 such as an NCO, VCO or DDFS. The inside loop functions as a wide bandwidth acquisition loop for frequency recovery on the carrier signal in a manner described above. The multiple loop system further includes a second loop, also termed the outside loop, which shares the carrier phase detector 60 with the inside loop and which functions as a narrow bandwidth centering loop, also for frequency recovery on the pilot signal. The third loop, of the multiple loop system, is the baud loop which functions to define symbol timing. As was described above, the first loop, the inside or acquisition loop, is operative only when the received signal is a VSB signal. The fourth loop, of the multi loop system including QAM and VSB phase detectors 120 and 122 in combination with Lopez filter 128 and exemplary NCO 114, functions as the frequency recovery acquisition loop in the QAM case, as well as the phase tracking loop for both VSB and QAM cases. As was described in connection with the inside and outside loops, above, the phase corrections developed by the QAM phase detector 120 are "leaked" to the outside loop's loop filter 68 on a 1-bit per period basis so as to provide a coarse correction to the outside loop in order that the outside loop can be constructed with a narrow bandwidth in order to maintain centering accuracy.

In the exemplary carrier recovery loop of FIG. 9, a particular form of phase detection employs symbols with the same time stamps for each phase error term, thus allowing acquisition and tracking of carrier frequency offset in addition to tracking of carrier phase offset. Conventionally, VSB systems use every second consecutive symbol for phase detection, with the two symbols representing one symbol offset. Due to this particular time offset, the resultant carrier loop is insufficient to perform carrier frequency acquisition and tracking, as well as more susceptible to self phase noise, introduced during phase detection when compared to an equivalent QAM phase detection.

Figure 10:
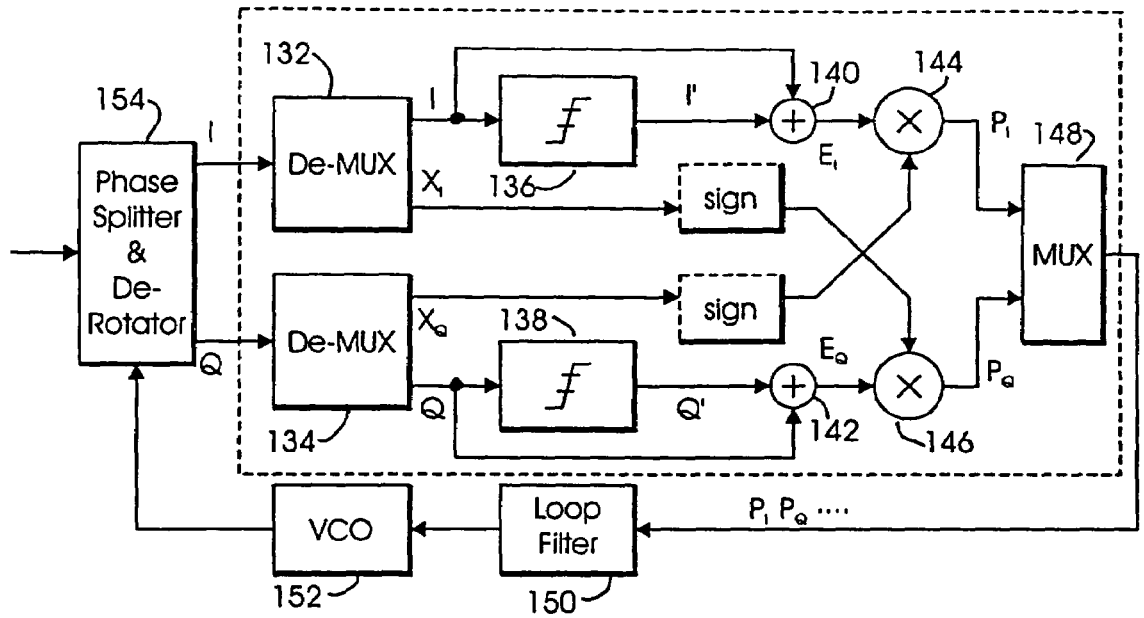
FIG. 10 is a simplified, semi-schematic block diagram of a QAM phase detector suitable for implementation in the dual mode QAM/VSB receiver architecture of FIG. 9.

FIG. 10 is a simplified block diagram of a carrier recovery network such as might be implemented in a dual mode QAM/VSB receiver. The carrier recovery network includes a phase detector 130 configured to receive in-phase I and quadrature-phase Q input signals. The in-phase signal should have been sampled twice a symbol at both the in-phase symbol sampling time and at the quadrature-phase sampling time. The in-phase signal is then 1-to-2 de-multiplexed to generate two information streams, denoted I and $X_I$, where the I represents in-phase symbols sampled at the in-phase sampling time and the $X_I$ represents mid-symbol points sampled at the quadrature-phase symbol sampling time.

Similarly, the quadrature-phase symbol Q having been sampled twice a symbol is 1-to-2 de-multiplexed to generate two information streams representing the quadrature-phase symbols (Q) and its mid-point symbols ($X_Q$), respectively. Accordingly, when an in-phase signal is de-multiplexed in order to generate a symbol (I), the quadrature-phase signal is de-multiplexed to generate its mid-symbol point ($X_Q$), and vice versa.

Following de-multiplexing, both the in-phase and quadrature-phase symbols are decoded in respective decision device blocks 136 and 138 to generate symbol decisions I with a 'I' and 'Q', respectively. The original sample value I and Q is arithmetically combined with the decisions 'I' and 'Q' in respective adders 140 and 142 in order to generate an error term $E_I$ and $E_Q$, respectively for the I rail and the Q rail.

Phase error terms are generated, one for each rail, as $P_I$ and $P_Q$, respectively by taking the product of a particular rail's error term and multiplying it by the corresponding rail's mid-symbol point. For example, the phase error term for the I rail, $P_I$ is equal to the quantity (I-'I')*$X_Q$.

Alternatively, the phase error term $P_I$ might also be represented as (I-'I')*sign($X_Q$) Similarly, the phase error term for the Q rail can be expressed as ('Q'-Q)*$X_I$, or ('Q'-Q)*sign($X_I$). In either case, the I, 'I' and $X_Q$ in each I rail phase error term computation have the same time index, as do the Q, 'Q' and $X_I$ for each Q rail phase error term computation. Thus, there should be a corresponding pair of $P_I$ and $P_Q$ phase error terms per symbol which exhibit an offset equal to the offset between the initial I and Q signals.

In accordance with the exemplary embodiment of FIG. 10, each pair of $P_I$ and $P_Q$ phase error signals are further multiplexed, in multiplexer 148, in order to generate two consecutive phase error terms, for each symbol, which are provided in turn to a loop filter 150. The loop filter 150 develops control voltage for the loop's VCO 152 which provides a timing reference signal for an input phase splitter and derotater 154 which functions as a phase correction block.

The carrier phase loop of FIG. 10, will be understood to include a phase detector capable of extracting the phase and/or frequency difference between the transmitted carrier and received carrier in order to accurately demodulate received signals.

Figure 11:
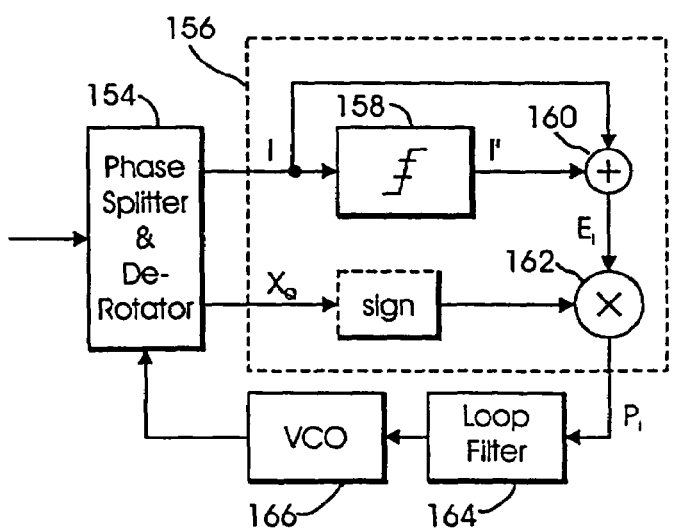
FIG. 11 is a simplified, semi-schematic block diagram of a VSB phase detector, where the Hilbert transform of an input signal is provided directly.

FIG. 11 is a simplified, block level diagram of a carrier phase detection and correction loop as it might be implemented if the receiver were operating in VSB mode. In FIG. 11, the input signal is received by a phase splitter and derotater 154 which provides a single sideband signal (I) to the VSB phase detector 156, along with a counterpart signal $X_Q$, where the single sideband signal I and its counterpart $X_Q$ form a Hilbert transform pair.

As was the case in connection with the QAM phase detector 130 of FIG. 10, the I signal is decoded, i.e., quantized to a valid symbol, in a decision device 158 to generate a valid symbol 'I'. The 'I' and the valid symbol 'I' are negatively combined in a summing circuit 160 in order to define an error term $E_I$. A multiplier 162 combines the error term $E_I$ with the sideband signal counterpart $X_Q$ in order to define a phase error term $P_I$ which can be expressed as $(I-'I')^*X_Q$ or alternatively, $(I-'I')^*\text{sign}(X_Q)$. The phase error term $P_I$ is provided to a loop filter 164 which develops a control voltage for a reference signal synthesizer such as a voltage controlled oscillator (VCO) 166. The synthesized reference is provided, in turn, to the phase splitter and rotater 154 in order to provide a phase correction to incoming single sideband VSB signals.

Figure 12:
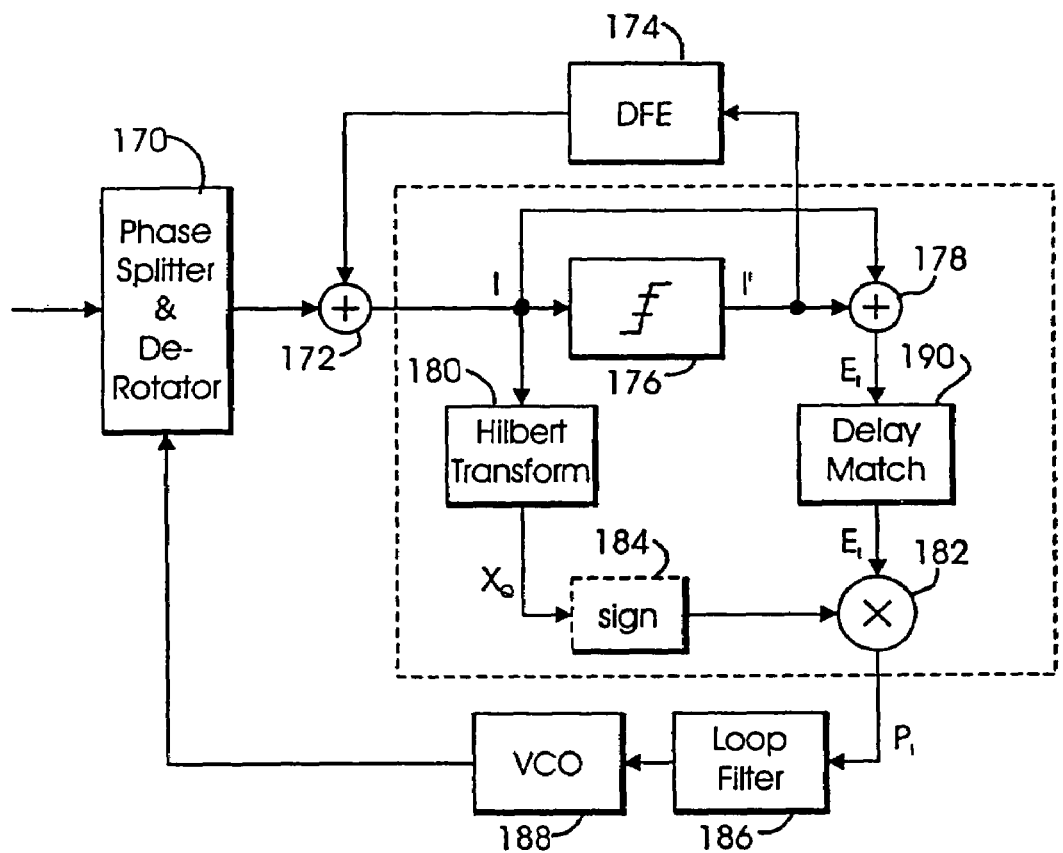
FIG. 12 is a simplified, semi-schematic block diagram of a VSB phase detector where the Hilbert transform of an input signal is provided within the phase detector.

Turning now to FIG. 12, there is depicted a simplified, semi-schematic block diagram of an alternative embodiment of a VSB-type carrier phase detection and correction system in accordance with the present invention. As was the case with the carrier phase detection and correction system of FIG. 11, the system of FIG. 12 receives a single sideband (VSB) signal through a phase splitter and derotater 170 and provides a I signal to a summing junction 172 where it is combined with the output of a decision feedback equalizer (DFE) 174. It should be noted herein that the summing junction 172 and DFE 174 correspond to the summing junction 117 and DFE 118 of the exemplary embodiment illustrated in FIG. 9.

I rail signals are directed to a decision device 176, such as a slicer, where the incoming I signals are quantized to a valid constellation point 'I quantized symbols, i.e., decisions, are fed back into the DFE 174 and further provided to a second summing junction 178 where they are negatively combined with the input signal I in order to define an error term $E_I$ representative of the displacement of the input signal I from its ideal (quantized valid) value. The error signal $E_I$ may thus be viewed as representing a rotational or phase error of the input signal I from its ideal quantized value 'I.

In order to determine the direction of phase rotation, i.e., to determine a phase lead or phase lag, the error $E_I$ is multiplicatively combined with a midpoint signal $X_Q$ which is the Hilbert transform of the input signal I. $X_Q$ is developed through a Hilbert transform circuit 180. $X_Q$ might be combined directly with the error term $E_I$ in a multiplier 182 or alternatively, might be evaluated to determine its sign in an optional sign determination circuit 184. Thus, the output of the exemplary carrier phase detector of FIG. 12 is a generated phase error term is $P_I$ which might be expressed as either $(I-'I')^*X_Q$ or $(I-'I')^*\text{sign}(X_Q)$. The phase error term $P_I$ is directed to a loop filter 186 which develops a control signal (a control voltage) that controls the operational parameters of a reference signal synthesizer such as a VCO. The synthesized reference signal is provided to the phase splitter and derotater 170 which, in turn, "derotates" incoming signals in order to properly recover and track carrier phase.

It should be understood that the exemplary embodiment of FIG. 12, where the Hilbert transform $X_Q$ of an incoming I signal is generated internally, is suitably implemented in the case where the phase detector is provided in combination with a baseband decision feedback equalizer (DFE) or when the derotater is implemented such that only an in-phase component of a received signal is produced. In the exemplary embodiment of FIG. 11, a Hilbert transform circuit would not be required since the Hilbert transform $X_Q$ of the incoming signal I is directly available.

Returning to FIG. 12, it should be understood that the Hilbert transform circuit 180 introduces some measure of delay in the signal path between the input to the decision device 176 in the input to the multiplier 182 for combination with an error term $E_I$. An arbitrary delay introduced in any one leg of the signal paths would thus contribute a delay term (an additional error term) to the output phase error term $P_I$ which would have the effect of either over or under compensating any phase lead or phase lag exhibited by the incoming signal. Accordingly, an additional delay stage 190 is introduced between the output of the summing junction 178 and the multiplier 182 in order to match the delay introduced by the Hilbert transform circuit 180. Since the phase detection and correction circuit of FIG. 12 is immanently suitable for implementation in integrated circuit technology, the delays caused by the Hilbert transform circuit 180 can be calculated to a reasonable degree of accuracy. Once delay has been characterized, a suitable matching delay can be devised by constructing the delay stage 190 with similar integrated circuit components having similar response characteristics and parasitic resistances and capacitances to the Hilbert transform circuit 180.

It should be understood that in carrier recovery systems based on the pilot, both QAM and VSB constellations are able to be accurately decoded so long as the phase of the pilot accurately represents the average phase of the signals. However, as is well understood by those having skill in the art, typical communication channels exhibit a non-linear phase response causing the pilot to often be attenuated. The channel phase response at the pilot location is quite often different from the channel phase response elsewhere along the spectrum, thus causing a constellation to be effectively rotated when evaluated in connection with pilot phase. Since a systems' equalizer is expecting true baseband from the pilot, the system response might be accurately characterized with respect to pilot frequency but not necessarily accurately with respect to pilot phase, i.e., the system exhibits pre-equalizer rotation. Since the Equalizer is expecting to receive a signal that might be characterized as $A(t)e^{jwt+\phi}$, where the first portion of the exponential term represents frequency and the second portion of the exponential term represents phase.

Figure 13:
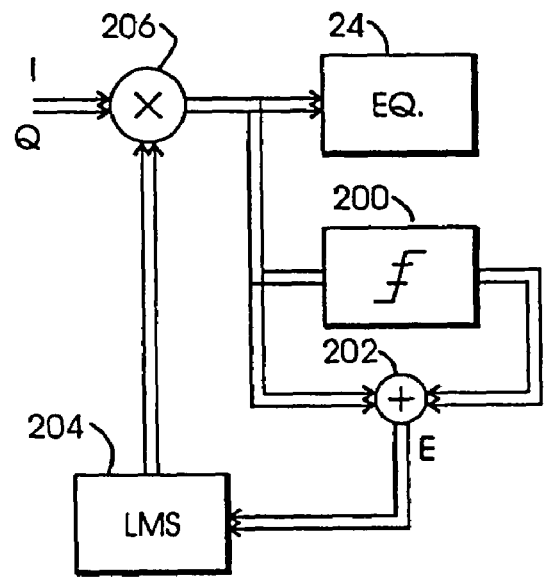
FIG. 13 is a simplified, semi-schematic block diagram of a single bit derotater provided at the equalizer input of the dual mode QAM/VSB system of FIG. 9.

In order to minimize pre-equalizer rotation, the dual mode QAM/VSB receiver according to the invention incorporates a 1-tap LMS derotater in OQAM mode in order to perform a pre-equalizer phase correction. Turning now to FIG. 13 and with reference to the exemplary embodiment of a dual mode QAM/VSB receiver of FIG. 9, the 1-tap LMS derotater is suitably disposed in the signal path before the equalizer 24 (also identified with the same reference numeral in the exemplary embodiment of FIG. 9). Complex signals I and Q are evaluated in a decision device 200 that is implemented in the exemplary embodiment of FIG. 13 as a slicer. Input complex signals I and Q are negatively combined with quantized OOQPSK symbol values in a summing junction 202 in order to define a complex error term E. Complex error E is processed by a least means squares (LMS) function block 204 to develop a rotational alpha α having the conventional representation $\alpha_{n+1} = \alpha_n - \mu \cdot X^* \cdot E$, where μ represents the step change.

α is applied to a complex multiplier 206 where it is used to provide any needed pre-equalizer rotation correction before the complex signals I and Q are directed to the equalizer circuit 24.

Figure 14:
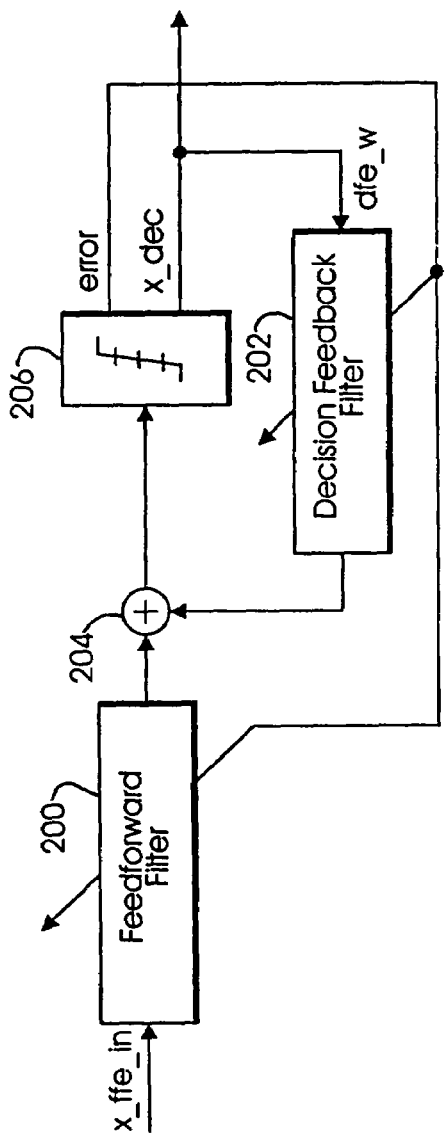
FIG. 14 is a simplified, semi-schematic block diagram of a decision feedback equalizer.

As discussed above in connection with FIG. 9, the dual mode QAM/VSB receiver according to the invention incorporates a decision feedback equalizer (24 of FIGS. 1 and 9) which is suitably constructed of a feedforward filter section (or FFE) and a decision feedback filter section (or DFE) as is illustrated in the simplified, semi-schematic exemplary embodiment of FIG. 14. In particular, an input signal, represented as x_FFE_in is directed to a feedforward filter element 200. After filtering, the signal is summed with the negative of the output of a decision feedback filter element 202 in a complex summing junction 204. Summed signals are directed to the input of a decision device 206, such as a multi-level slicer, which provides a signal decision, denoted x_dec, at one output and an error term, denoted "error", representing a vector difference between a valid, quantized constellation point an actual received value. Decisions developed by the slicer 206 are further directed to the input of a decision feedback filter element (DFE) as a parallel signal denoted a DFE word, and identified as dfe_w. Thus, as is well understood by those having skill in the art, the received signal x_ffe_in is only used by the feedforward filter element 200, while an estimated decision signal x_dec is used by the decision feedback filter element 202. At the summing junction 204, an FFF filter version of the tail portion of the channel impulse response is canceled by the DFF weighted estimated signals. Any noise enhancement introduced by a DFE is only caused by equalization of the remaining smaller portion of the channel impulse response. As is also well understood, a feedforward filter (FFF) compensates for channel distortion with linear equalization and can be implemented at multiples of the baud rate. Decision feedback filters (DFF) cancel the tail portion of the channel impulse response using recovered data symbols. As such, a DFF can be implemented only at the baud rate.

No matter how implemented, the decision feedback filter element 202 is a highly complex system which performs a significant number of arithmetic calculations, at extremely high clocking speeds. The number of calculations performed necessarily depends upon both the length of the filter, i.e., the number of coefficients (or taps) that contribute to the final output signal, as well as the width of the filter, represented by the filter's wordlength or the number of bits required for representation of the symbols at the input of the DFE. Reducing the wordlength of the decision feedback filter 202 significantly reduces the complexity of the decision feedback filter block.

Figure 15:
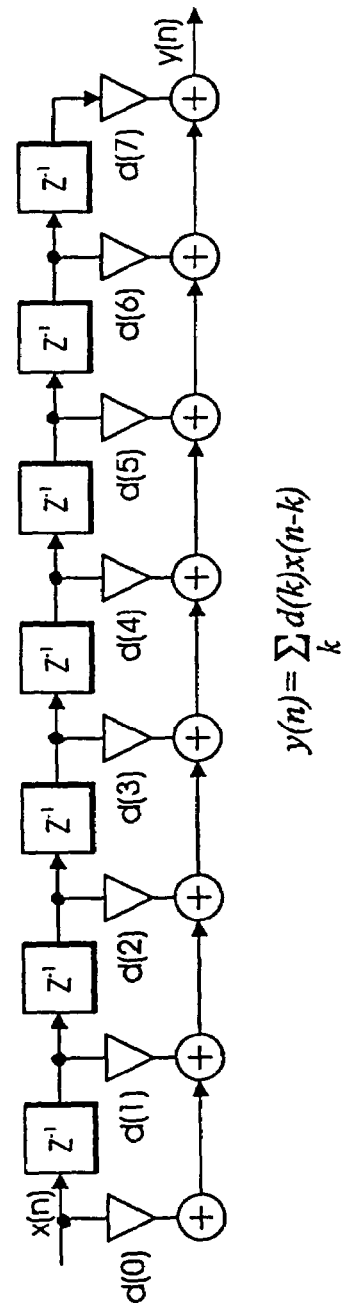
FIG. 15 is a simplified block diagram of an exemplary 8-tap decision feedback filter.

FIG. 15 is a simplified block level diagram illustrating an exemplary 8-tap decision feedback filter, suitably implemented as a sequential string of delay stages, with the output of each delay stage, as well as symbols at the DFF input, each being multiplied by a corresponding coefficient, denoted $d(0) \ldots d(7)$. Each of the coefficient multiplied signals are summed together at summing junctions in order to define a filter output $y(n)$. It should be understood that $d(0) \ldots d(7)$ denotes 8 multiplication operations, each of which require significant investments in processing hardware, and each of which are performed in parallel fashion with an index equal to the decision feedback filter word length dfe_w. The hardware complexity of these multiplication operations are linearly reduced when the word length dfe_w is reduced.

Figure 16:
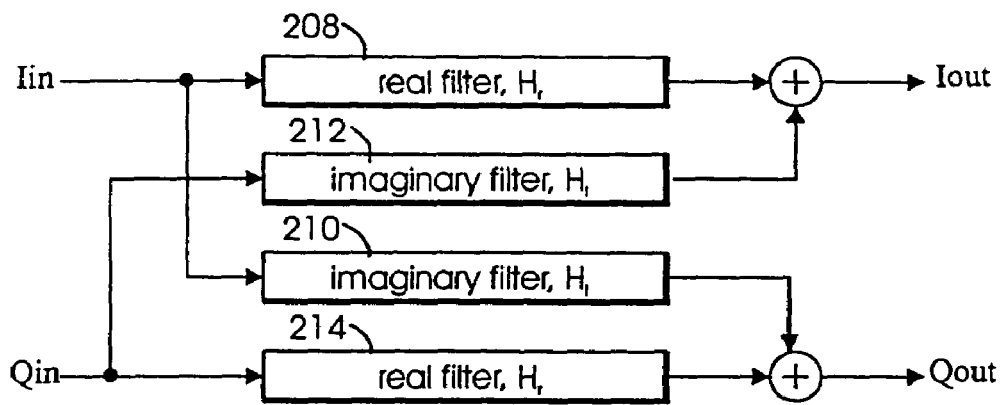
FIG. 16 is a simplified semi-schematic block diagram of a complex decision feedback or complex decision feedforward filter.

QAM modulated signals include an in-phase component and a quadrature-phase component, denoted I and Q respectively, which requires the use of a complex decision feedback equalizer such as depicted in semi-schematic block diagram form in FIG. 16. Briefly, the exemplary complex decision feedback equalizer of FIG. 16 includes real and imaginary filters for each of the in-phase and quadrature-phase input components. For example, an in-phase signal Iin is processed by a real filter 208 whose output is summed with the output of an imaginary filter 212 which receives a quadrature-phase input. Likewise, the quadrature-phase input is processed by a real filter 214 whose output is summed with the output of an imaginary filter 210 which, in turn receives an in-phase signal Iin as an input. Thus, it should be understood that the exemplary complex decision feedback equalizer of FIG. 16 is nothing more than a graphical, block diagram representation of the mathematical function defining a complex filter.

Figure 17:
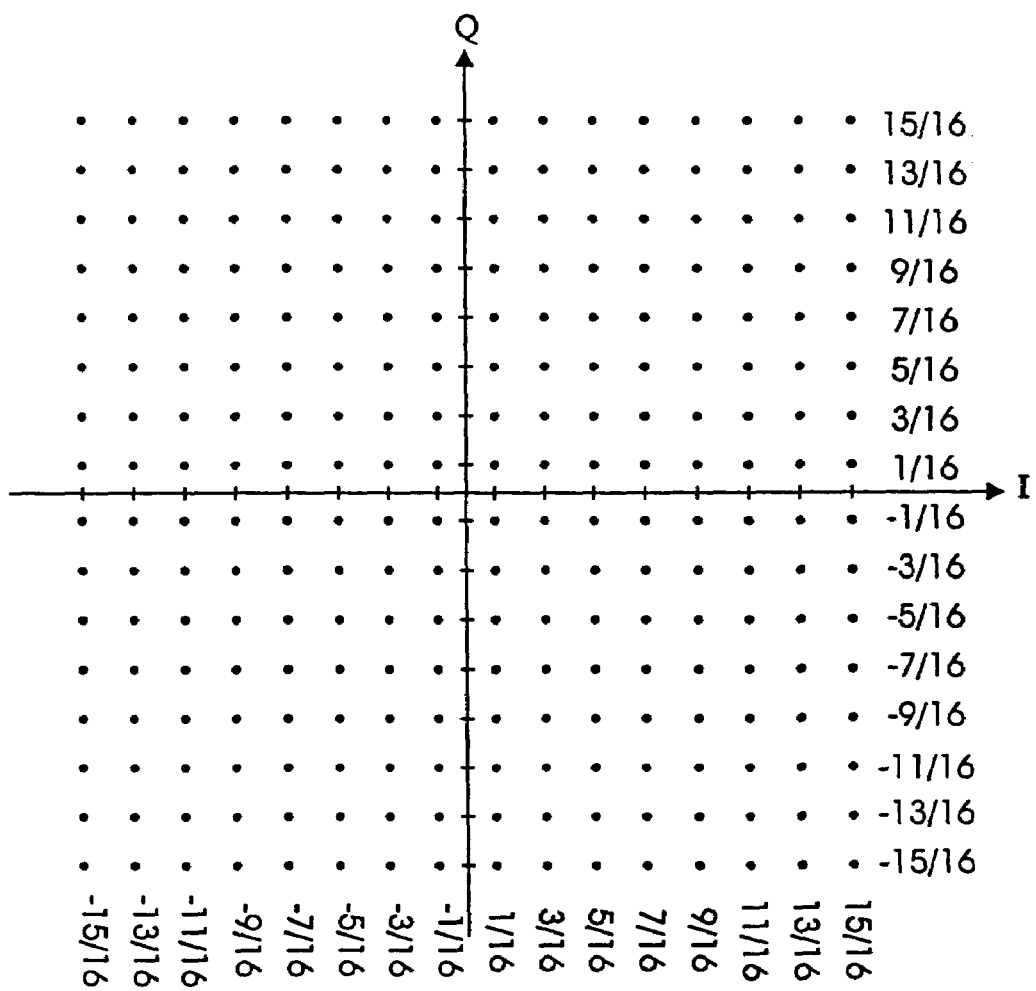
FIG. 17 is a graphical representation of a 256 QAM constellation.

In the case where the exemplary complex decision feedback equalizer of FIG. 16 is operating on a 256 QAM signal, 8-bits are required to adequately define the representation of each symbol at the input to the exemplary complex dfe. This is because 256 QAM symbols requires $LOG_2(256)=8$-bits for symbol representation. The 8-bit representation of each symbol can be divided into two subsets, with 4-bits chosen to represent real symbols (denoted as in-phase or I symbols) and 4-bits chosen to represent imaginary symbols (denoted as quadrature-phase or Q symbols). When represented in this manner, a 256 QAM constellation might appear as depicted in the graphical representation of FIG. 17, and suitably includes the $2^4=16 \times 16=256$ complex symbols, symmetrically arranged about the I and Q axis.

In order to maintain the symmetry about the zeros of the I and Q axis, as well as for ease of numerical processing, the binary two's compliment numbering system is used for implementing the signal processing functions in the exemplary dual mode QAM/VSB receiver. Utilizing two's compliment as the numbering system, results in a $-\frac{1}{2}$ bit offset in representation of each of the QAM symbols. As can be determined from the exemplary 256 QAM constellation represented in FIG. 17, quantized symbol points (desired symbols) range from $-\frac{15}{16}$ to $\frac{15}{16}$ on both the I and Q axes with a $\frac{1}{8}$ offset, or separation, between symbol points. Thus, an input signal $x(n)$ would take on values of $\{-\frac{15}{16}, -\frac{13}{16}, -\frac{11}{16}, -\frac{9}{16}, -\frac{7}{16}, -\frac{5}{16}, -\frac{3}{16}, -\frac{1}{16}, \frac{1}{16}, \frac{3}{16}, \frac{5}{16}, \frac{7}{16}, \frac{9}{16}, \frac{11}{16}, \frac{13}{16},$ and $\frac{15}{16}\}$.

However, a 4-bit representation of each of the 256 QAM symbol points in the two's compliment numbering system can be expressed as $\{1000_b, 1001_b, 1010_b, 1011_b, 1100_b, 1101_b, 1110_b, 1111_b, 0000_b, 0001_b, 0010_b, 0011_b, 0100_b, 0101_b, 0110_b, 0111_b\}$ which, when expressed in common numerical form represents an input signal, denoted by $z(n)$, which takes on the discrete values $\{-\frac{16}{16}, -\frac{14}{16}, -\frac{12}{16}, -\frac{10}{16}, -\frac{8}{16}, -\frac{6}{16}, -\frac{4}{16}, -\frac{2}{16}, 0, \frac{2}{16}, \frac{4}{16}, \frac{6}{16}, \frac{8}{16}, \frac{10}{16}, \frac{12}{16}$ and $\frac{14}{16}\}$. Thus, it will be understood that the effective input signal $z(n)$, when processed, would give symbol quantization results that are incorrect by a fixed offset, equal to $-\frac{1}{16}$, and which is denoted herein by a. Since $-\frac{1}{16}$ may be represented by the binary value 00001 in two's compliment, the $-\frac{1}{16}$ fixed offset may be corrected by adding a=00001 to $z(n)$ as a correction factor.

While effective to some degree, adding a correction factor in this manner raises the number of bits required to represent each I and Q symbol from 4-bits to 5-bits for each discrete symbol point. Thus, an input signal $x(n)$ that accurately represents discrete symbol points would be represented by $\{10001, 10011, 10101, 10111, \ldots 01001, 01011, 01101,$ and $01111\}$ which correctly represents the desired discrete symbol values from $-\frac{15}{16}$ to $\frac{15}{16}$. However, increasing the wordlength required to accurately represent a symbol from 4-bits to 5-bits linearly increases the complexity of the multipliers used to implement the decision feedback filter portion of the system's DFE.

Figure 18:
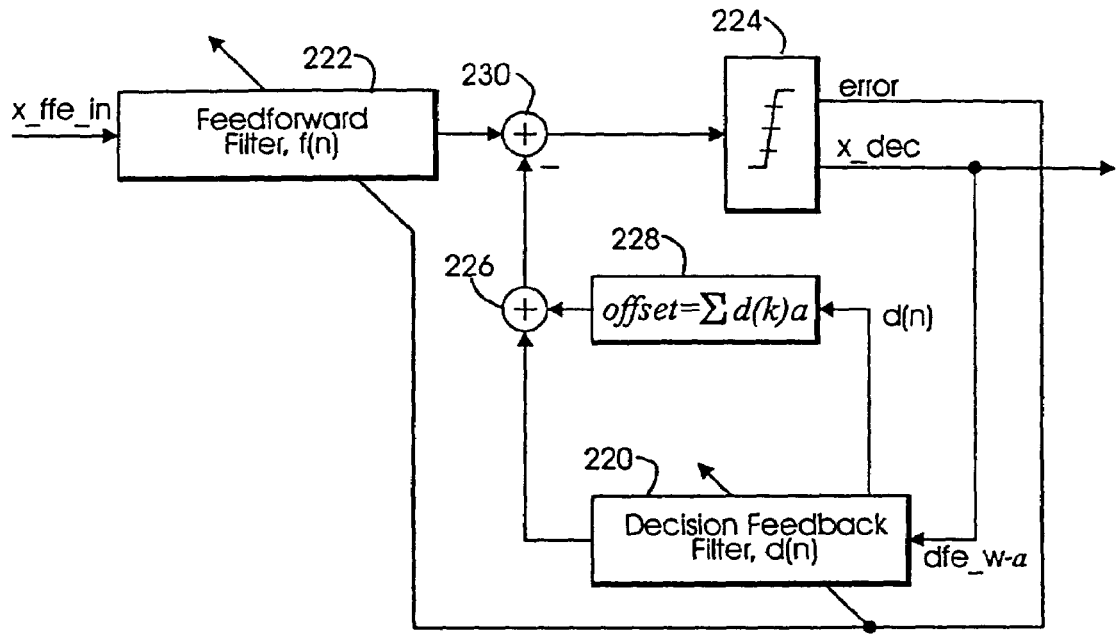
FIG. 18 is a simplified, semi-schematic block diagram of a decision feedback equalizer including computational offset correction circuitry in accordance with the invention configured for QAM modulated signals.

In accordance with the invention, a decision feedback equalizer (DFE) constructed in accordance with the simplified, block diagram of FIG. 18, includes a decision feedback filter 220 that accommodates a two's compliment representation of discrete symbol points in a manner that minimally effects the increase in hardware complexity caused by the two's compliment numbering system. In the exemplary embodiment of the DFE of FIG. 18, an input signal x_ffe_in is received by a feedforward filter 222, having a coefficient set represented by f(n). The feedforward filter's output is directed to a decision device 224, such as a slicer, configured to output a tentative decision, represented by x_dec and an error term. Tentative decisions are directed to the input of a decision feedback filter 220 in the form of an input signal, denoted x(n), which may be alternatively described as a DFE word represented as dfe_w. However, and in accordance with the invention, the DFE word is a 4-bit representation and, thus, does not include the fifth bit fixed offset term denoted by a. Thus, the DFE word is represented in the exemplary embodiment of FIG. 18 as dfe_w-a.

Returning momentarily to the exemplary decision feedback filter of FIG. 15, it will be realized that such a filter, with input x(n), output y(n), and coefficients d(n) can be characterized by the convolutional equation $y(n)=\Sigma_k d(k)x(n-k)$. However, if the input signal to the exemplary filter of FIG. 15 is viewed as including an input stimulus portion and a fixed offset portion, the input signal could be expressed as x(n)=z(n)+a. Given this particular mathematical relationship, and substituting terms in the filter response characteristic, the filter output might be represented as $y(n)=\Sigma_k d(k)z(n-k)+\Sigma_k d(k)a$, where a represents the fixed offset term and z(n) represents the input stimulus.

From the above, it will be evident that the filter's output might be expressed as the sum of two independent terms, a first term in which the input stimulus z is convolved with the coefficient set d and a second term in which the coefficient set d is convolved with the fixed offset term a. When separated, the first portion of the filter's response characteristic retains the original representational word length (4-bits according to the foregoing exemplary description) which is directed to the input of the decision feedback filter 220 of the exemplary embodiment of the DFE of FIG. 18. The characteristic filter output y(n) is developed in a summing node 226 which sums the output of the decision feedback filter 220 with the output of an offset generation circuit 228 which provides an offset correction signal equal to the convolution of the decision feedback filter coefficients d with the fixed offset term a. Thus, an offset equal to $\Sigma_k d(k)a$ is added to the output of the decision feedback filter 220 at the summing junction 226 down-stream from the output of the decision feedback filter.

The offset cancellation circuit 228 might be constructed as a simple register which receives adaptively defined coefficients d(n) from the decision feedback filter 220. Coefficient values are multiplied by the fixed offset a and summed for all k to define the offset term added to the output of the decision feedback filter. Accordingly, intensive numerical processing, performed by the decision feedback filter 220, is performed on a DFE wordlength of only 4-bits. Processing required to generate the offset term is minimal and requires a significantly lower investment in computational hardware than if the offset term were incorporated in the DFE word as a fifth bit. Computational complexity is significantly reduced as a consequence.

The decision feedback filter output y(n), which includes the offset term, is negatively summed with the output of the feedforward filter 222 at a summing circuit 230. The sum of the negative of the decision feedback filter output and the feedforward filter output is provided as an input to the slicer 224. It bears mentioning that the error term developed by the slicer 224 is provided as a control input to both the decision feedback filter 220 and the feedforward filter 222 for adaptively modifying the content of the coefficient registers such that the decision feedback filter and feedforward filter converge. Needless to say, the adaptively reconfigured coefficients d(n) of the decision feedback filter 220 are provided to the offset cancellation circuit 228 to accurately correlate the offset term to the output of the decision feedback filter. The extent of the reduction in computational complexity of the filters in a DFE constructed in accordance with the invention might be better understood when it is recognized that the exemplary dual mode QAM/VSB receiver includes a 496-tap decision directed equalizer having 64 feedforward taps and 432 feedback taps. A 20% reduction in the decision feedback filter circuitry (reducing the DFE wordlength from 5-bits to 4-bits) more than compensates for the minimal additional hardware required by the offset cancellation circuit 228.

The foregoing discussion was concerned with reducing the computational complexity of DFE elements that might otherwise have obtained as a result of carrying forward a fixed offset value of a two's compliment representation of a 256 QAM constellation. In the case of VSB modulated signals, the same type of symbol representational offset occurs with regard to a VSB constellation, as well as a DC offset term introduced as an artifact of the above-described pilot. The ATSC standard for VSB transmission requires utilization of a pilot tone as a carrier reference. When a received spectrum is mixed down to baseband, the pilot tone reduces to a DC component at baseband and which must consequently be subtracted from an equalizer signal prior to its introduction to the slicer and subsequently added back to the decision signal defined at the slicer output.

Figure 19:
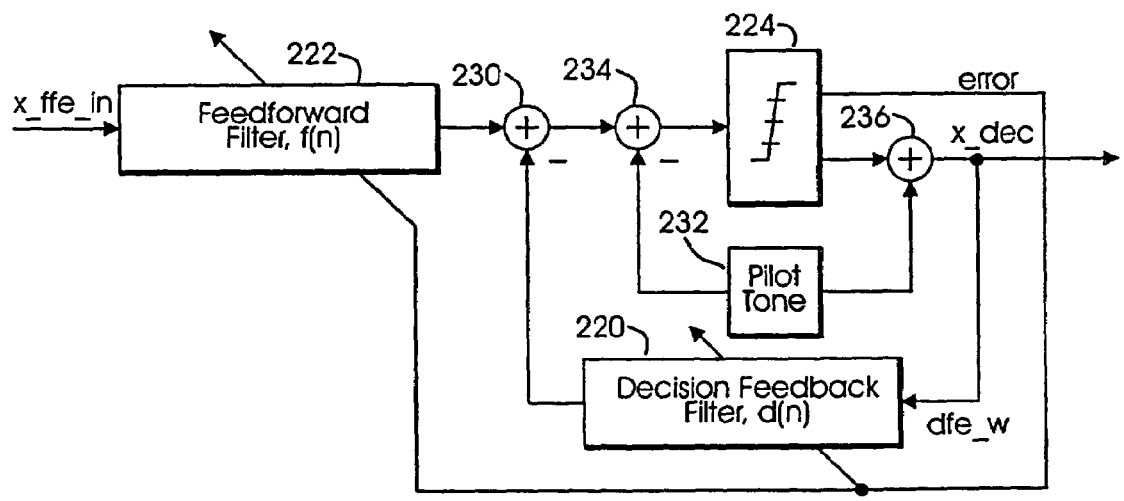
FIG. 19 is a simplified, semi-schematic block diagram of a decision feedback equalizer including a pilot tone generation circuit.

FIG. 19 is a simplified block level diagram of a DFE similar to the exemplary embodiment of FIG. 18, but further including a pilot tone generation circuit 232 which functions to develop a DC component equal to the pilot's DC component baseband. The DC component developed by the pilot tone generation circuit 232 is negatively summed with the filtered DFE input in a summing circuit 234 prior to the signals being directed to the slicer 224. The DC component developed by the pilot tone generation circuit 232 is further added to the tentative decision x_dec developed by the slicer, in summing circuit 236, prior to the decisions being provided to the input of the decision feedback filter 220 and also prior to its being output from the DFE for decoding and error correction. The DC component, thus added to the decision value has the effect of increasing the DFE wordlength at the input to the decision feedback filter 220. In the case of 8 VSB the discrete symbol values might be represented as {−7/8, −5/8, −3/8, −1/8, 1/8, 3/8, 5/8, and 7/8} with the value of the pilot tone generally recognized as 5/32. In ordinary binary terms, the DFE wordlength that would be necessary to represent 8 VSB symbols is 3-bits. However, utilizing the two's compliment numbering system results in a −1/8 offset, in a manner similar to the QAM case described above, which requires an additional bit for its representation, resulting in 4-bits being required to accurately represent each of the 8 VSB constellation points. When the pilot tone value is factored into the foregoing, it should be understood that the pilot tone further increases the DFE wordlength by adding 5/32, or $000101_b$ in two's compliment representation, to each symbol value, resulting in a 2-bit increase to the wordlength (thus increasing the wordlength from 4-bits to 6-bits). Thus, the DC pilot tone component of 5/32, in combination with the fixed −1/8 symbol offset, necessitates an approximately 50% increase in the computational complexity of a decision feedback filter of a DFE operating on 8 VSB modulated signals.

Figure 20:
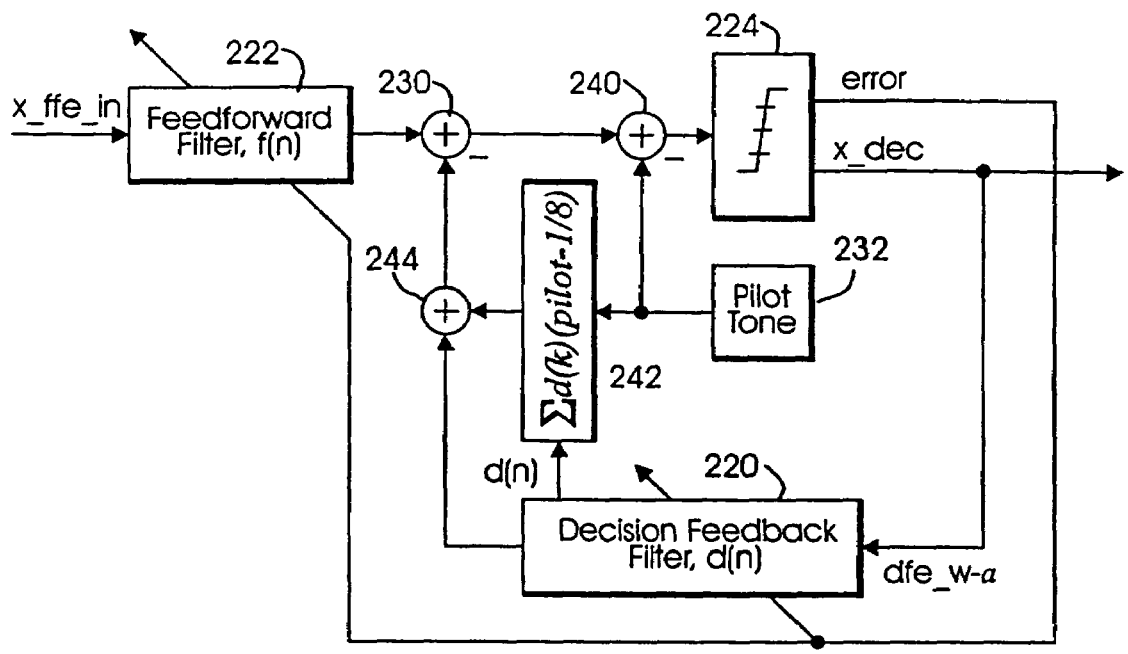
FIG. 20 is a simplified, semi-schematic block diagram of a decision feedback equalizer in accordance with the invention including offset correction circuitry for VSB modulated signals.

Turning now to FIG. 20, an additional exemplary embodiment of a decision feedback equalizer, configured for VSB modulated signals, and constructed to reduce DFE wordlength from the nominal 3-bit case back to an original 3-bit representation, is illustrated in simplified, semi-schematic block diagram form. In particular, the pilot tone generation circuit 232 develops a DC component equal to the pilot tone DC component at baseband, and provides the component value to a summing circuit 240, where it is subtracted from the filtered DFE signal prior to its introduction of the slicer 224. However, and in accordance with the invention, the pilot tone generation circuit 232 is decoupled from the decision output of the decision slicer 224 and instead provides the DC component corresponding to the pilot tone to an offset correction circuit 242 which functions to compensate the output of the decision feedback filter 220 with an offset term a equal to the value of the pilot tone minus the ⅛ offset introduced by the two's compliment numbering system.

In general terms, the same mathematical analysis may be performed on the DFE exemplified in FIG. 20 as was performed on the DFE exemplified in FIG. 18. Specifically, the tentative decision x_dec is provided to the decision feedback filter 220 as a 3-bit DFE word, dfe_w-a, that does not include the 2-bits representing the −⅛ computational offset and the 5/32 pilot tone value. The pilot tone and computational offset values are convolved with the filter's coefficient values in order to define an offset term which is summed with the filter output in a summing circuit 244 to define a decision feedback filter output y(n). The DFF output y(n) is subtracted from the output of the feedforward filter 222 in the summing circuit 230 prior to its introduction to the slicer 224.

Not only does the offset correction circuit 242 function to significantly reduce the complexity of the decision feedback filter 220 in the VSB case, but it also allows the pilots on generation circuit 232 to be decoupled from the slicer's output. In the conventional DFE embodiment of FIG. 19, the pilot tone value is added back to the slicer output prior to the tentative decision's being provided to the decision feedback filter because the pilot tone value is subtracted from the slicer's input signal, after the decision feedback filter output has been combined with the feedforward filtered input signal. The DC component removed from the signal after the decision feedback filter 220 must be replaced in order that the filter remain converged.

In the exemplary embodiment of FIG. 20, pilot tone DC compensation, as well as computational offset computation, occurs in a loop disposed inside the feedback loop of the decision feedback filter, as well as occurring prior to the slicer 224. Thus, pilot tone DC compensation occurs twice in the signal path between the decision feedback filter output and the input to the slicer; a first compensation associated with the offset correction circuit 242, where a compensation term related to the pilot term is added to the output of the decision feedback filter, and a second compensation occurring just prior to the input of the slicer where the pilot tone DC component is removed from the input signal. Completely removing the pilot tone DC component from the signal within the DFE is further advantageous in that there is not DC offset present in signals provided to the decoder and forward error correction (FEC) circuitry following the DFE. Additional savings in the complexity of FEC and decoder circuitry can be realized by obviating the requirement that a signal from the DFE be processed with DC offset components.

Trellis coded modulation is employed in modern digital communication systems to improve a system's bit error rate in high noise situations. Trellis coded modulation (TCM) achieves a performance gain by increasing the size of a constellation within the modulation scheme, thereby increasing the "distance" between possible transmitted sequences. A particular example of a TCM communication system might include the U.S. digital terrestrial broadcasting standard, which employs a trellis coded 8 VSB modulation scheme. The particular code used has an asymptotic coding gain of 3.31 db over uncoded 4 VSB.

Figure 21:
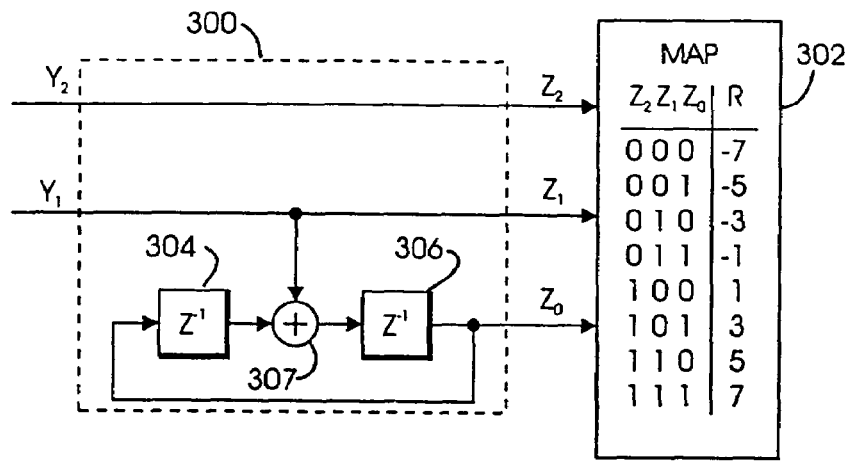
FIG. 21 is a simplified, semi-schematic block diagram of a trellis encoder including a symbol mapper suitable for 8 VSB transmission.

FIG. 21 is a simplified, semi-schematic block diagram of an exemplary encoder which might be provided in a typical terrestrial broadcast transmitter, and which might be represented in simplified form as a convolutional encoder 300 in combination with a signal mapper 302. A 2-bit input signal, $Y_1$ and $Y_2$ are input to the convolutional encoder 300 with the least significant bit, $Y_1$, also directed, in parallel fashion, through a convolutional encoder, implemented as a linear feedback shift register, in order to generate a redundancy bit which is a necessary condition for the provision of coding gain of the code.

As described above, the convolutional encoder 300 includes a linear feedback shift register, constructed of two delay elements 304 and 306 (conventionally denoted by $Z^{-1}$) separated by a summing circuit 307, which function to combine the least significant bit $Y_1$ of the input word with the output of the delay elements 304 and 306. The time sequence formed by the LSB bit stream is convolved with the coefficients of the linear feedback shift register in order to produce the time sequence of the redundancy bit. Thus, the convolutional encoder might be viewed as a state machine.

The signal mapper 302 maps the resulting 3 bits, $Z_2$, $Z_1$, and $Z_0$ into a particular constellation level. Since there are 3-bits coming into the symbol mapper 302, a maximum of 8 levels might be represented by combinations of the 3-bits. As will be understood from the block diagram of FIG. 21, the 8 possible levels might be represented as −7, −5, −3, −1, 1, 3, 5 and 7.

However, since coding increases signal modulation from 4 levels to 8 levels, decision directed loops, such as decision directed adaptive equalization, decision directed carrier and/or timing recovery loops, and the like, are forced to function with respect to an increased constellation size of 8 levels.

Figure 22:
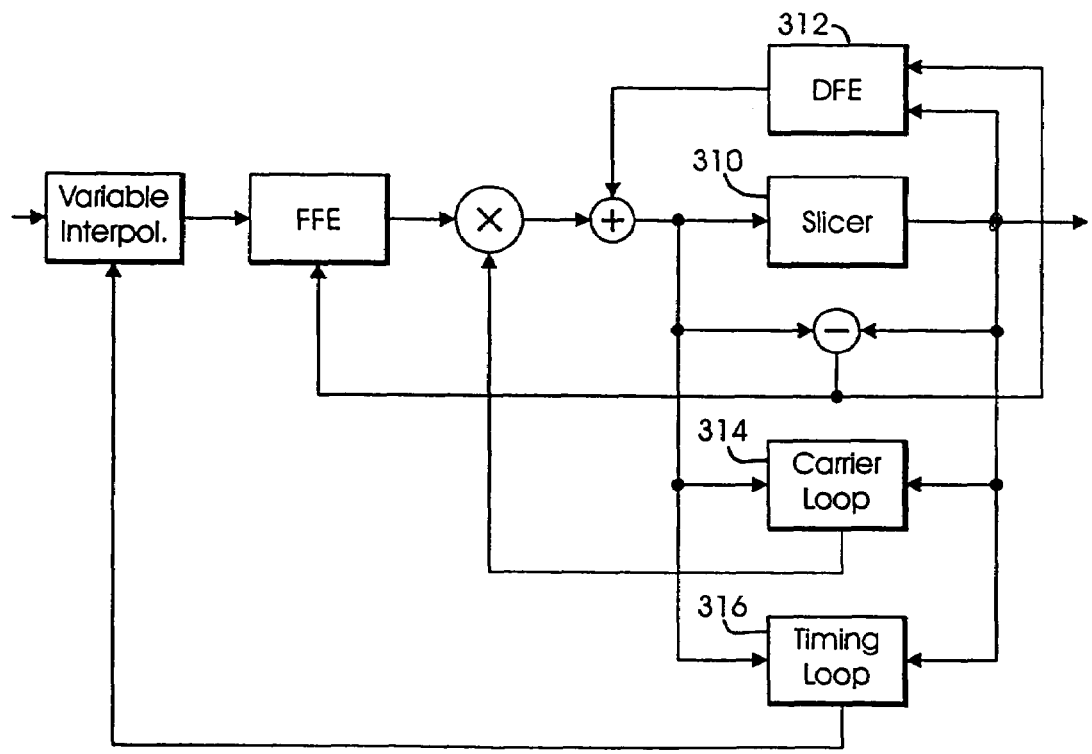
FIG. 22 is a simplified, semi-schematic block diagram of a decision feedback equalizer circuit, including carrier and timing loops and a symbol-by-symbol slicer.

Turning now to FIG. 22, an exemplary decision directed carrier and timing recovery loop is shown in simplified, semi-schematic block diagram form, and includes a symbol-by-symbol slicer 310 as a decision device, operating in combination with a DFE 312 to generate tentative decisions suitable for use by a carrier loop 314 and timing loop 316. However, at signal-to-noise ratios (SNR) near system threshold, the loops will fail due to the combination of higher noise and larger constellation size. As a result, the system will not be able to achieve adequate lock, and the expected coding gain from TCM would not be realized. In particular, a symbol-by-symbol slicer does not employ sequence estimation in generating symbolic decisions. Rather, it operates only upon the "current" symbol, ignoring any past decisions.

On the other hand, were the DFE input to be taken from a best survivor path in a trellis decoder's trace back memory, the system would be able to exploit the correlations between a "current" symbol and past decisions, by maximum likelihood sequence estimation, for example. The DFE input would thus exhibit a lower error rate and, with a higher percentage of correct decisions, the DFE's ability to operate in low SNR environments is enhanced.

Figure 23:
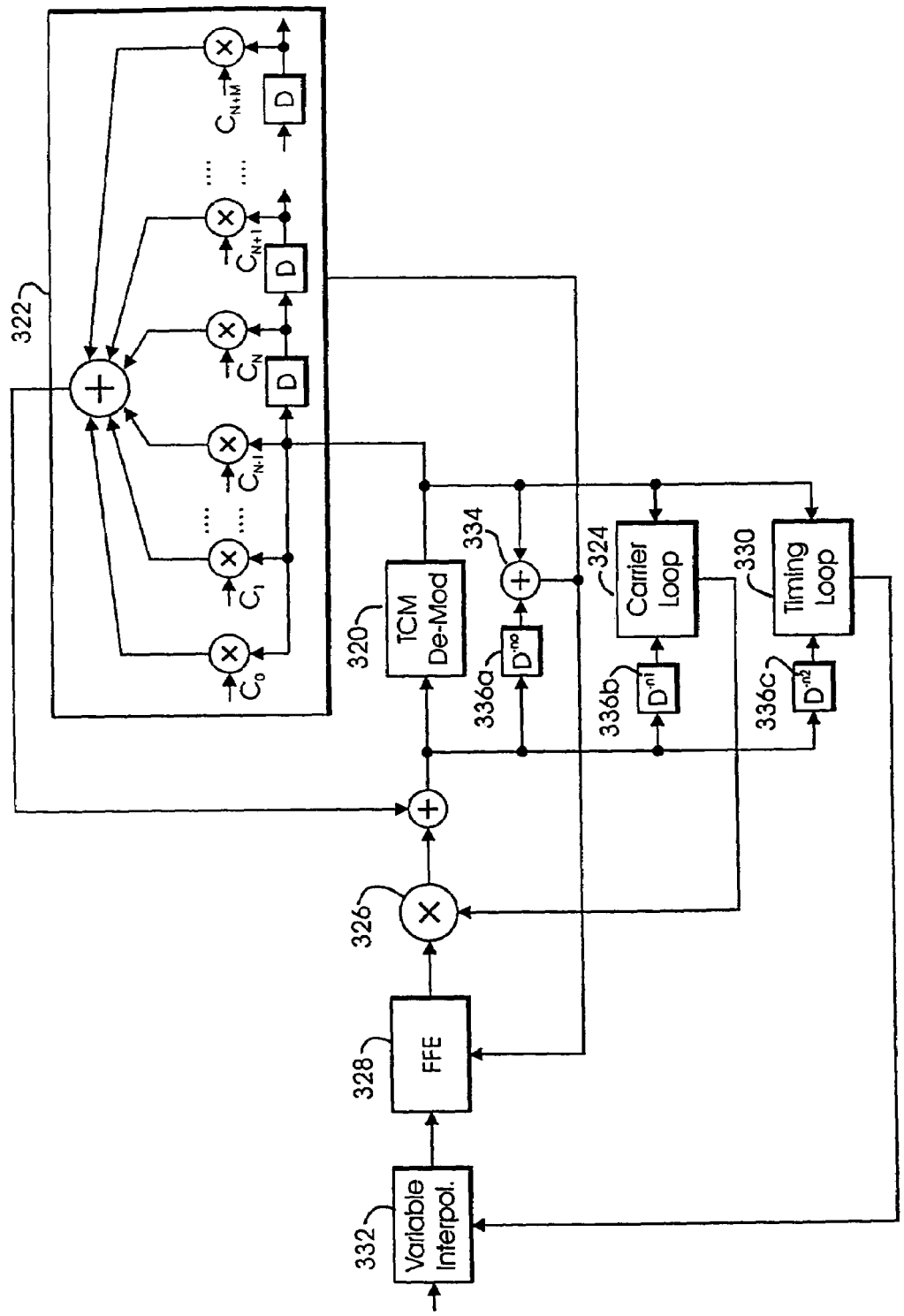
FIG. 23 is a simplified, semi-schematic block diagram of a decision feedback equalizer circuit, including carrier and timing loops and a TCM decoder circuit in accordance with the invention.

Turning now to FIG. 23, there is shown in simplified, semi-schematic block diagram form, a generalized decision feedback equalizer circuit that includes a TCM demodulation circuit, also termed a Viterbi decoder, which provides the input to a decision feedback equalizer 322. The system includes a carrier loop 324 that drives a derotater 326 disposed between the Viterbi 320 and a feedforward equalizer 328.

In addition to the carrier loop 324, the system also includes a symbol timing loop 330, coupled to provide a symbol timing reference to a variable interpolating filter 332. Although the symbol timing loop 330 is depicted in the exemplary embodiment of FIG. 23, the symbol timing loop 330 need not be decision directed, in the context of the present invention, but might alternatively be configured to operate upon an enhanced pilot signal in a manner described in connection with FIGS. 4 and 9.

In accordance with the invention, the input and output of the Viterbi 320 is directed to a summing junction 334 which combines an input signal and a tentative decision from the Viterbi in order to generate an error term. The error term, in turn, is used to drive the coefficient tap update of the FFE 328, as well as the coefficient tap update of the DFE 322. Providing a lower probability of error in the tap update signal significantly improves the performance and reliability of the FFE 328.

As will be described in greater detail below, TCM decoders exhibit a tradeoff between system delay and the reliability of symbolic decisions. In general, making use of decisions farther back in the history of a TCM demodulator tends to increase the reliability of the decision, with most reliable decision being the final decision. However, each stage in the process involves a certain amount of delay and it is sometimes desirable to choose decisions from some intermediate point of the traceback history. The earlier the chosen decision, the less the consequent delay. Accordingly, variable delay circuits 336a, 336b and 336c are provided between the input of the Viterbi 320 and the summing junction 334, the carrier loop 324 and the timing loop 330. The variable delay circuits 336a, b and c function to match the delay of the chosen symbol output from the Viterbi such that the summing junction 334, carrier loop 324 and timing loop 330 operate on signals having the same time stamp.

Figure 24:
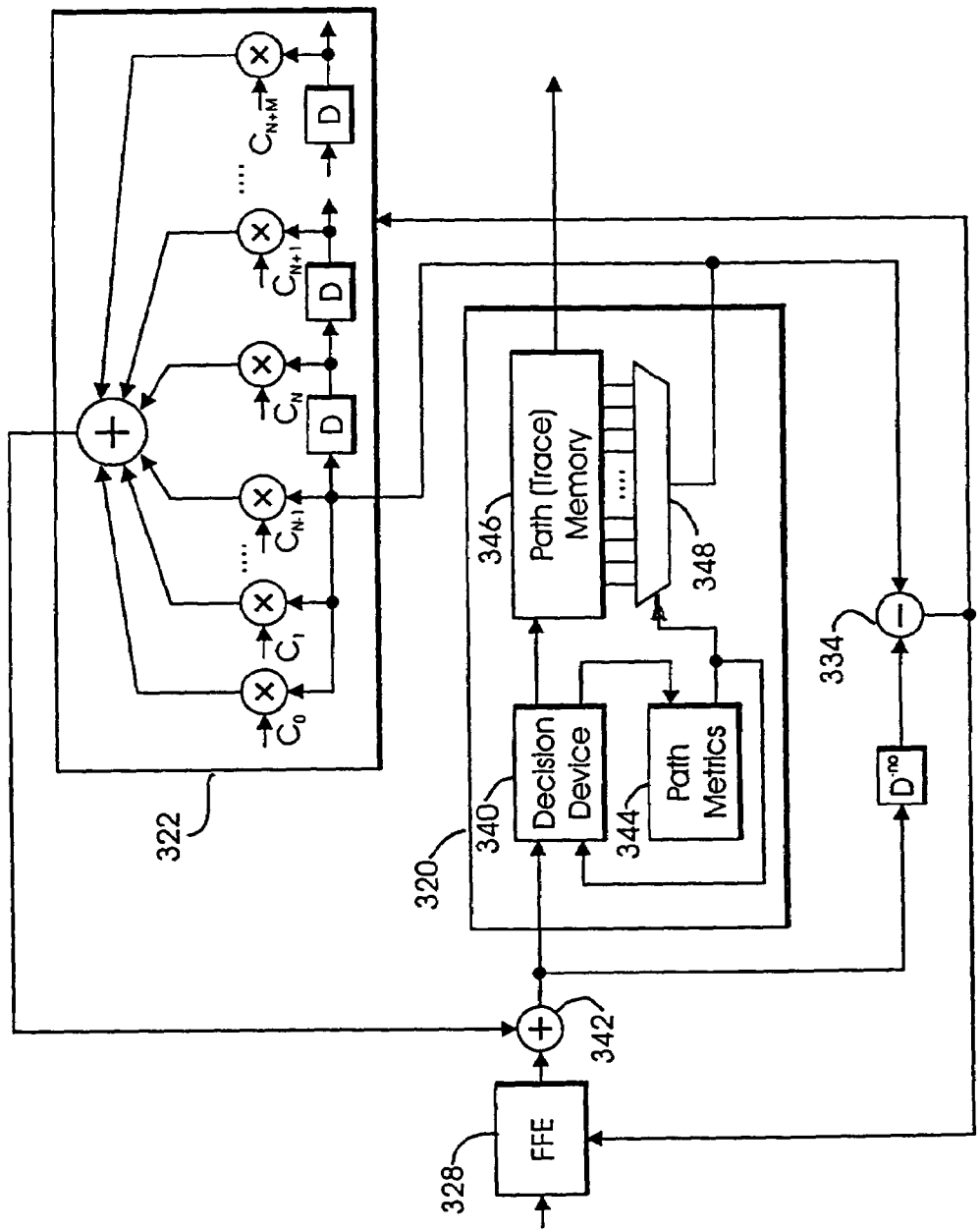
FIG. 24 is a simplified, semi-schematic block diagram of a decision feedback equalizer circuit depicting the construction and arrangement of a TCM decoder circuit in accordance with the invention.

Turning now to FIG. 24, a TCM decoder, or Viterbi decoder, is depicted in semi-schematic, block diagram form at 320. A Viterbi suitably includes a decision device 340 coupled to receive an input signal from an FFE 328 that has been summed with the output of a DFE 322 in a summing junction 342. A Viterbi decoder processes information signals iteratively, tracing through a trellis diagram corresponding to the one used by the encoder, in an attempt to emulate the encoder's behavior. At any particular time frame, the decoder is not instantaneously aware of which node (or state) the encoder has reached. Thus, it does not try to decode the node at that particular time frame. Instead, given the received sequence of signal samples, the decoder calculates the most likely path to every node and determines the distance between each of such paths and the received sequence in order to determine a quantity called a path metric.

Further, the Viterbi 320, in accordance with the invention, makes an assumption that the surviving paths at the Nth time frame pass through a common first branch and outputs a decision for time frame 0 on the basis of that assumption. If this decision is incorrect, the Viterbi 320 will necessarily output a few additional incorrect decisions based on the initial perturbation, but will soon recover due to the nature of the particular relationship between the code and the characteristics of the transmission channel. It should be noted, further, that this potential error introduction source is relatively trivial in actual practice, since the assumption made by the Viterbi that all surviving paths at time frame n pass through a common first branch at time frame 0, as a correct one to a very high statistical probability.

In FIG. 24, the exemplary trellis decoder (or Viterbi) 320 further includes a path metrics module 344 and a path memory module 346 in addition to the decision device 340. A path metric, as the term is used herein, is well known and refers to a plurality of elemental paths between neighboring trellis nodes, which form, by extension, a path. The Viterbi selects the best path for each incoming signal and updates a path memory stored in the path memory module 346 and the path metrics stored in the path metrics module 344. It will, thus, be understood that the path (or trace) memory module 346 includes a historical record of a particular number of past decisions, with the number of past decisions represented by a depth parameter N.

Any one of a number of historical decisions may be taken from the path memory 346 and provided both to the DFE 322 and an error term generating summing junction 334 by selecting the appropriate historical signal through a multiplex circuit 348.

Figure 25:
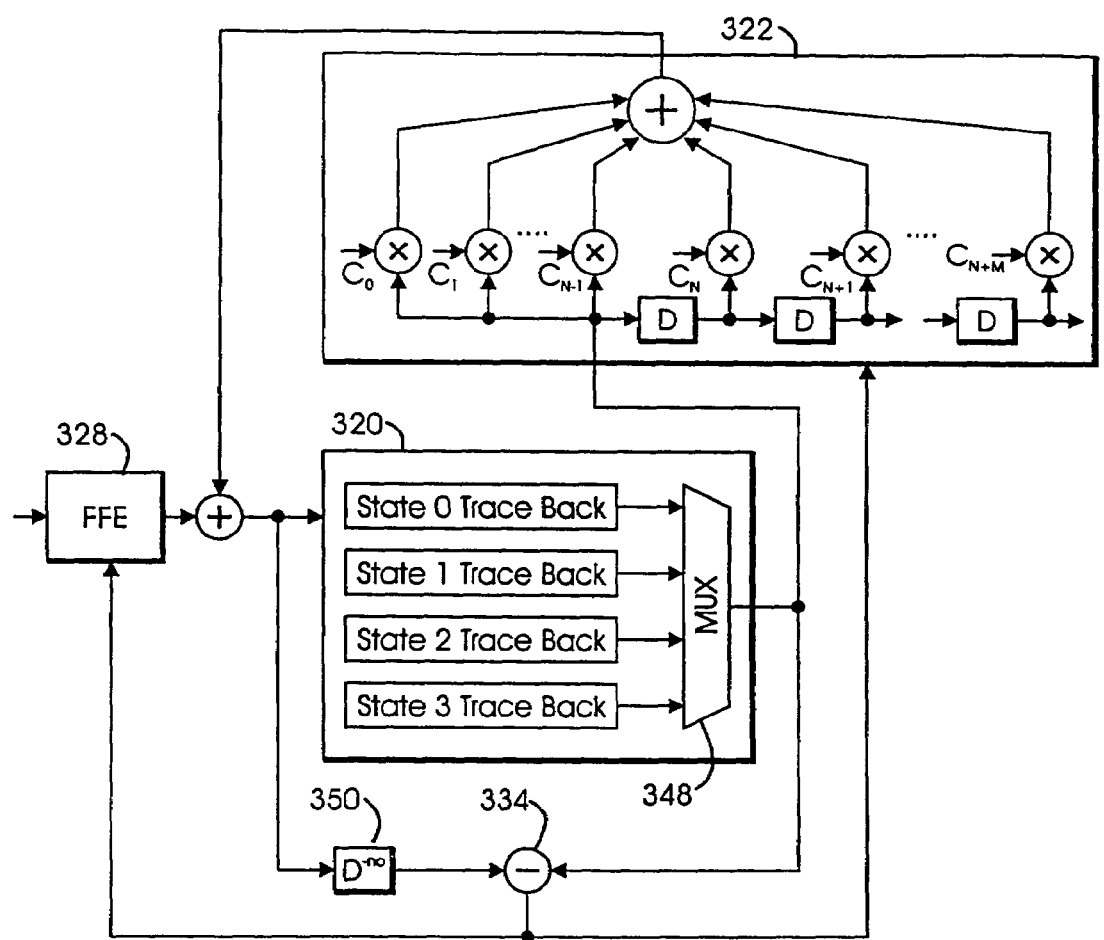
FIG. 25 is a simplified, semi-schematic block diagram of a 4-state traceback path memory circuit suitable for practice of the present invention.

Turning now to FIG. 25, the TCM demodulator (or Viterbi) 320 might be considered as including 4 traceback registers, with each traceback register specific to a particular one of the 4 states making up the 8 VSB signal. A MUX 348 selects one of the 4 traceback registers, corresponding to the one containing the most likely symbol, in accordance with a select signal defined by the path metrics module (344 of FIG. 24). The particular symbolic decision chosen by the MUX 348, is output from the TCM demodulator and provided to the DFE 322 where it is combined with a set of N non-causal coefficients, where N represents the length N of each of the traceback registers. Further, the output symbolic decision from the TCM demodulator 320 is processed by a set of M+1 causal coefficients in the DFE 322, where M represents the difference between the total number of coefficient taps and the length of the traceback register (the number of non-causal taps).

Further, the output of the TCM demodulator 320 is provided to a summing junction 334 where its value is combined with the TCM demodulator input in order to define an error term based upon the difference between an input signal sample and an output symbolic decision. This error term is then provided to both the DFE 322 and an FFE 328 where it is used to update the tap coefficients.

As was mentioned earlier, symbolic decisions may be taken from each of the traceback memories at any one of the intermediate steps in the process. Depending upon the sequential position of the actual symbolic decision tap, a certain delay can be determined and that amount of delay is accommodated in a delay circuit 350 disposed between the input of the TCM demodulator 320 and the summing junction 334 in order that the time stamp of the input signal and the time stamp of the symbolic decision to be summed are equal. This delay is variable and programmable in that circuit simulations may be run in order to determine the delay/performance tradeoff characteristics. Either performance or delay (or a mixture of both) might be set as a decision metric and the system optimized for either maximum performance, minimum delay, or an adequate value of both. It is indicated in the exemplary embodiment of FIG. 23, the symbolic decisions, and consequent delay, need not necessarily be the same for defining the error term, providing an input to the carrier loop or the timing loop. Indeed, because of the different bandwidth constraints and acquisition characteristics of a carrier loop and a timing loop, it should be understood that the carrier loop needs to acquire at a much faster rate than the timing loop, allowing the timing loop to use a more "downstream" survivor path in the trellis decoder's path memory module and not be too concerned with its attendant delay.

In the case of a carrier loop, using decisions farther back in the history of the TCM decoder would tend to increase the reliability of decisions. However, increasing delay in the carrier loop correspondingly reduces the loop's tracking ability. Thus, the variable delay feature of the invention enhances overall system performance of a multi-loop decision directed system, as well as providing improved equalization characteristics.

The foregoing discussion discloses and describes merely exemplary methods and embodiments of a dual mode QAM/VSB receiver in accordance with the present invention. As will be understood by those familiar with the art, the various features and functions of the invention may be embodied in a variety of other specific forms without departing from the spirit or essential characteristics thereof. Accordingly, the disclosure of the present invention is intended to be illustrative of, but not limiting to, the scope of the invention, which is set forth in the following claims.

The invention claimed is:

1. A method for equalizing a first complex quadrature amplitude modulated (QAM) signal, comprising:
    applying a second complex QAM signal to a first decision device;
    combining the second complex QAM signal and the output of the first decision device to produce a complex error term;
    applying the complex error term to a single tap derotator to produce a correction term;
    applying the first complex QAM signal and the correction term to a multiplier to produce the second complex QAM signal;
    applying the second complex QAM signal to a feed forward equalizer (FFE);
    combining an output of the FFE and a timing reference signal to produce a timed signal;
    combining the timed signal and an output of a decision feedback equalizer (DFE) to produce a summed signal;
    applying the summed signal to a second decision device;
    applying an output of the second decision device to the DFE;
    combining the summed signal with the output of the second decision device to produce an error signal;
    applying the error signal to a QAM phase detector or a VSB phase detector based on a modulation of the first complex QAM; and
    generating the timing reference signal based on an output of the QAM phase detector or an output of the VSB phase detector.

2. The method of claim 1,
    wherein the DFE has adjustable taps, the method further comprising:
    adjusting the taps of the DFE responsive to the second complex QAM signal.

3. The method of claim 2, further comprising:
    recovering data embedded in the first complex QAM signal, the method additionally comprising adjusting a timing loop responsive to the first complex QAM signal.

4. The method of claim 3, further comprising:
    adjusting a carrier loop responsive to the first complex QAM signal to derotate the first complex QAM signal.

5. The method of claim 1,
    wherein the DFE has adjustable taps, the method further comprising:
    adjusting the taps of the DFE responsive to the first complex QAM signal.

6. The method of claim 1, further comprising:
    recovering data embedded in the first complex QAM signal, the method additionally comprising adjusting a timing loop responsive to the first complex QAM signal.

7. The method of claim 1, further comprising:
    adjusting a carrier loop responsive to the first complex QAM signal to derotate the first complex QAM signal.

8. The method of claim 1, further comprising:
    filtering the output of the QAM phase detector or the output of the VSB phase detector to produce a control signal.

9. The method of claim 8, wherein the step of filtering the output of the QAM phase detector or the output of the VSB phase detector comprises:
    filtering the output of the QAM phase detector or the output of the VSB phase detector to produce the control signal for a timing reference circuit.

10. The method of claim 8, further comprising:
    generating the timing reference signal based on the control signal.

11. The method of claim 1, wherein the step of generating the timing reference signal comprises:
    generating the timing reference signal using a numerically controlled oscillator (NCO) a voltage controlled oscillator (VCO) or a direct digital frequency synthesizer (DDDFS).

* * * * *